(12) United States Patent
Takahashi

(10) Patent No.: US 6,953,025 B2
(45) Date of Patent: Oct. 11, 2005

(54) FUEL SUPPLY CONTROL APPARATUS FOR INTERNAL COMBUSTION ENGINE

(75) Inventor: Tatsuhiko Takahashi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/775,061

(22) Filed: Feb. 11, 2004

(65) Prior Publication Data

US 2005/0045158 A1 Mar. 3, 2005

(30) Foreign Application Priority Data

Sep. 1, 2003 (JP) ........................................ 2003-309052

(51) Int. Cl.[7] ............................................... F02M 37/04
(52) U.S. Cl. ...................................... 123/497; 123/506
(58) Field of Search ................................ 123/497, 499, 123/506, 458, 459, 446

(56) References Cited

U.S. PATENT DOCUMENTS

| | | | | |
|---|---|---|---|---|
| 4,409,939 A | * | 10/1983 | Eheim et al. ................ | 123/357 |
| 5,771,865 A | * | 6/1998 | Ishida ......................... | 123/467 |
| 6,135,090 A | * | 10/2000 | Kawachi et al. ............. | 123/446 |
| 6,318,343 B1 | * | 11/2001 | Nakagawa et al. .......... | 123/500 |
| 6,715,470 B2 | * | 4/2004 | Takahashi .................... | 123/458 |

FOREIGN PATENT DOCUMENTS

JP         2000-161115 A    6/2000

* cited by examiner

Primary Examiner—Mahmoud Gimie
(74) Attorney, Agent, or Firm—Sughrue Mion, PLLC

(57) ABSTRACT

By controlling a high pressure pump with the use of a cam angle signal so as to open it and then close it after the lapse of a prescribed period corresponding to an amount of discharge, a fuel supply control apparatus for an internal combustion engine is capable of achieving the simplification of control while ensuring controllability without requiring correction even if valve timing is changed. A crank angle sensor generates a crank angle signal SGT in synchronization with the rotation of a crankshaft so as to supply the fuel in a fuel tank to an injector installed in a combustion chamber of each engine cylinder. A cam angle sensor generates the cam angle signal SGC in synchronization with the rotation of a camshaft. A high pressure pump has a suction stroke and a discharge stroke synchronized with the rotation of the camshaft and supplies the fuel to the injector. An ECU changes an effective stroke related to an exhaust stroke of the pump based on the cam angle signal SGC.

9 Claims, 15 Drawing Sheets

FUEL SUPPLY CONTROL APPARATUS FOR INTERNAL COMBUSTION ENGINE

BACKGROUND OF THE INVENTION

1. Field of the Invention

The present invention relates to a fuel supply control apparatus for an internal combustion engine which controls a fuel supply section for directly injecting fuel to a combustion chamber of each cylinder of the internal combustion engine. More particularly, it relates to a fuel supply control apparatus for an internal combustion engine in which highly accurate fuel pressure control can be achieved by controlling an effective stroke related to a discharge stroke of a fuel supply section with high accuracy.

2. Description of the Related Art

In general, a positive displacement fuel supply device in the form of a high pressure pump is used in a fuel supply control apparatus for an internal combustion engine for directly injecting fuel from an injector installed in a combustion chamber of each cylinder into the corresponding combustion chamber.

In such a known fuel supply control apparatus for an internal combustion engine, the high pressure pump is driven to operate by a pump cam that is driven to rotate by means of the internal combustion engine in synchronization with the rotation of a camshaft, the amount of fuel discharged by the pump is changed by changing ON and OFF periods of an electromagnetic valve during the discharge stroke of the pump.

At this time, the ON and OFF periods of the electromagnetic valve are changed by using a crank angle signal from a crank angle sensor.

In addition, the pump discharge stroke can be changed in synchronization with a valve timing control device, and such a change in the pump discharge stroke in this case is carried out by changing the ON/OFF timing of the electromagnetic valve according to an estimated value from detected valve timing (for instance, see a first patent document: Japanese patent laid-open No. 2000-161115).

Further, the positive displacement fuel supply section is controlled by an effective stroke changing section so as to adjust an effective stroke (i.e., an amount of discharge) of the pump related to the discharge stroke thereof, and the effective stroke changing section is constructed of an opening and closing timing decision section of a spill valve.

Hereinafter, reference will be made to a method of deciding the opening and closing timing of the spill valve that adjusts the amount of fuel discharged from the fuel supply section in the form of a high pressure pump.

First of all, an estimated value dlvvt of the amount of change of the valve timing is calculated by the following expression (1).

$$dlvvt=(VT-VT[i-1])+(VTT-VT) \quad (1)$$

where VT represents valve timing, VT[i−1] the last valve timing, and VTT target valve timing.

Subsequently, a reference valve-opening time afpons of the spill valve is calculated by the following expression (2).

$$afpons=afpoffs+awonbs-aoffset \quad (2)$$

where afpoffs represents a reference valve-closing time of the spill valve, and awonbs represents a valve-closing period of the spill valve, these pieces of information being stored as respective MAP data in a ROM. In addition, aoffset represents an amount of offset or distance from a reference position of the camshaft to a nose of the pump driving cam.

Then, a temporary valve-closing time afponb of the spill valve is calculated by the following expression (3) in consideration of an amount of operation of the valve timing.

$$afponb=afpons+VT \quad (3)$$

Subsequently, an amount of correction kaon for correcting the temporary valve-closing time afponb of the spill valve is calculated by the following expression (4).

$$kaon=(dlvvt/360) \times (QT+kacal-afponb) \quad (4)$$

where QT represents valve-opening and valve-closing time calculation timing, and kacal represents a crank angle from the time of detection of VT to the valve-opening and valve-closing time calculation timing QT.

Thereafter, an amount of correction kaonw in the valve-opening period of the spill valve is calculated by the following expression (5).

$$kaonw=(dlvvt/360) \times awonb \quad (5)$$

where awonb represents a valve-opening period of the spill valve.

Subsequently, a valve-closing timing afpon of the spill valve is calculated by the following expression (6).

$$afpon=afponb+kaon \quad (6)$$

Finally, a final valve closing period awon of the spill valve is calculated by the following expression (7).

$$awon=awonb+kaonw \quad (7)$$

The final valve closing period awon of the spill valve calculated from expression (7) above becomes an effective discharge period of the high pressure pump.

The known fuel supply control apparatus for an internal combustion engine as described above is constructed such that the reference valve opening and closing times afpons, afpoffs of the spill valve are calculated based on the crank angle signal, and corrected in accordance with the amount of operation of the valve timing control device. Therefore, there is a problem that the control and calculation of the opening and closing timings of the spill valve became complicated.

Moreover, since the calculation timing of the opening and closing times of the spill valve is in synchronization with the crank angle signal, there is another problem that it is necessary to control both the opening timing and closing timings of the spill valve with respect to a change in the valve timing, thus resulting in a further complication of control and calculations.

Furthermore, in order to control both of the opening and closing timings of the spill valve, it is necessary to decide the opening and closing timings at extremely earlier timing than the time required for actual control, and hence there is a further problem that the error between the estimated value and the actual value becomes large, thus deteriorating fuel pressure controllability of the fuel to be supplied in the injectors.

SUMMARY OF THE INVENTION

Accordingly, the present invention is intended to obviate the problems as referred to above, and has for its object to provide a fuel supply control apparatus for an internal combustion engine which is capable of achieving the simplification of control while ensuring controllability without requiring correction even if the valve timing has been changed, by controlling a spill valve in a high pressure pump by using a cam angle signal in such a manner that the high pressure pump is opened and then closed after the lapse of a prescribed period of time corresponding to a prescribed amount of fuel to be discharged from the pump.

Bearing the above object in mind, the present invention resides in a fuel supply control apparatus for an internal combustion engine, which serves to supply fuel in a fuel tank to an injector installed in a combustion chamber of an internal combustion engine. The apparatus includes: a crank angle detection section for generating a crank angle signal in synchronization with the rotation of a crankshaft of the internal combustion engine; a cam angle detection section for generating a cam angle signal in synchronization with the rotation of a camshaft of the internal combustion engine; a positive displacement fuel supply section having a suction stroke and a discharge stroke synchronized with the rotation of the camshaft for supplying the fuel to the injector; and an effective stroke changing section for changing an effective stroke related to the discharge stroke of the fuel supply section. The effective stroke changing section operates in synchronization with the crank angle signal and the cam angle signal so as to change the effective stroke based on the cam angle signal.

According to the present invention, control can be simplified while ensuring controllability when the opening and closing timings of the fuel supply section is controlled by using the crank angle signal.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1.

Figure 1:
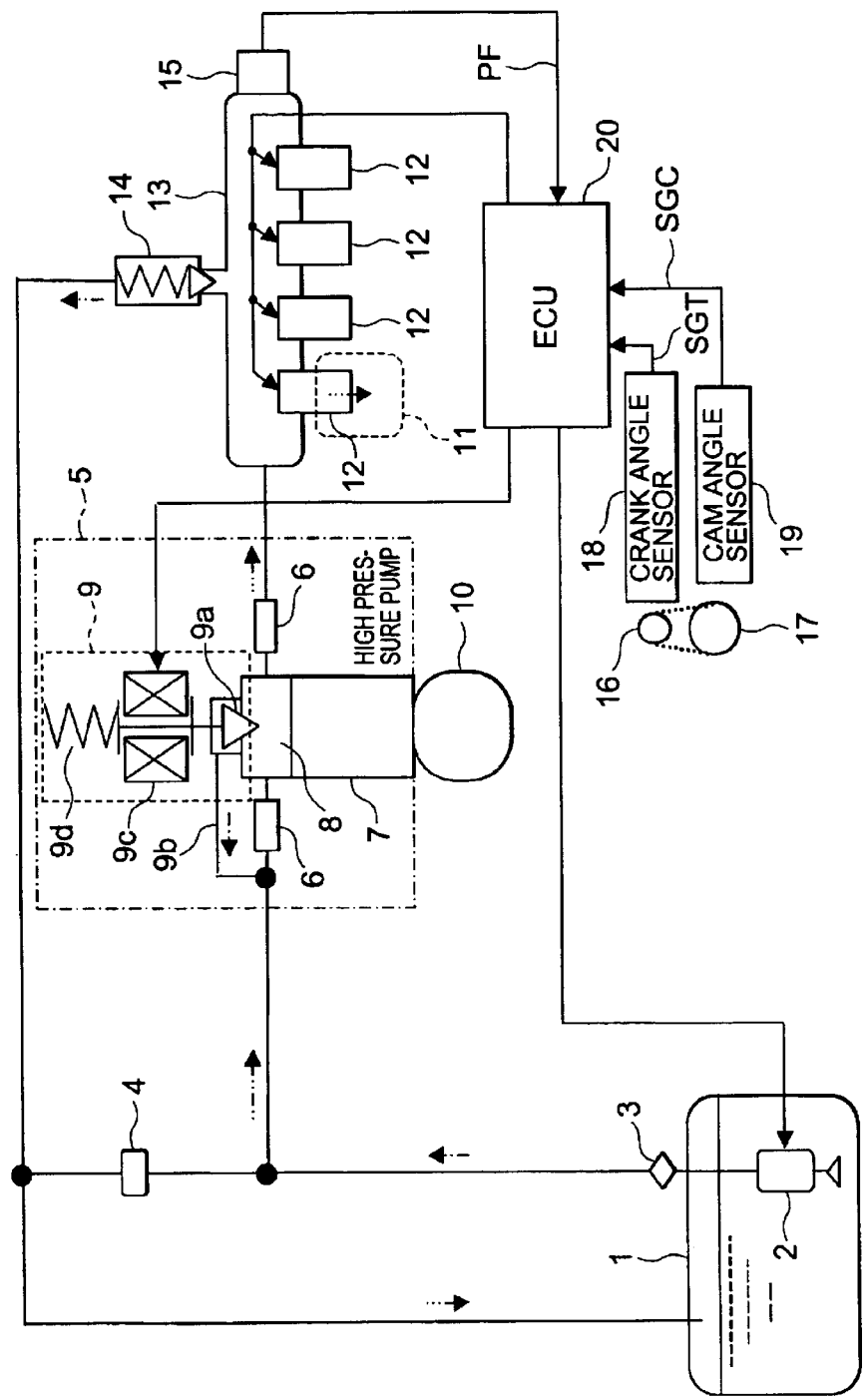
FIG. 1 is a block diagram showing the construction of a fuel supply control apparatus for an internal combustion engine according to a first embodiment of the present invention.
Figure 2:
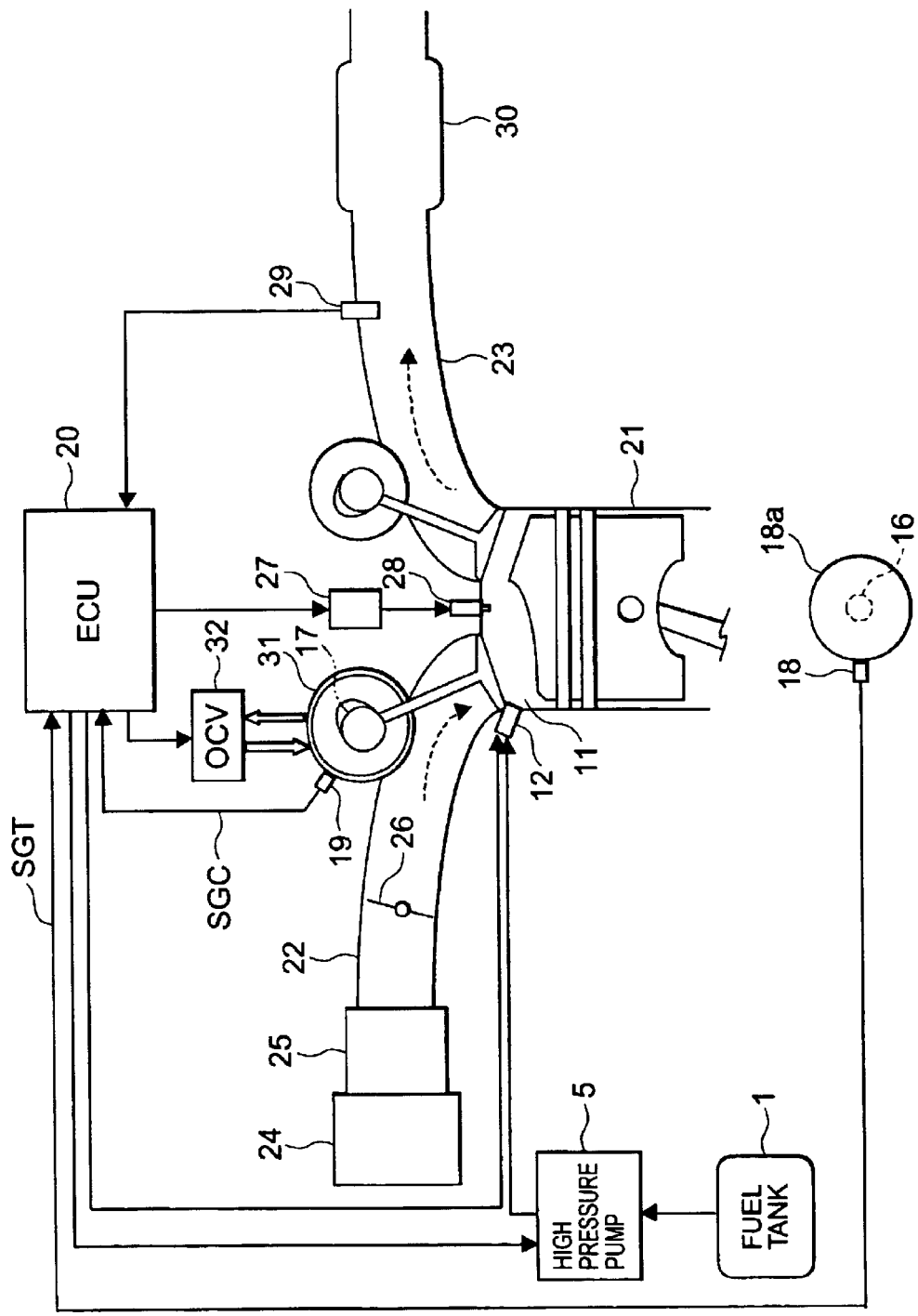
FIG. 2 is a block diagram showing the structure of the internal combustion engine along with its surroundings according to the first embodiment of the present invention.

FIGS. 1 and 2 are block diagrams showing a fuel supply control apparatus for an internal combustion engine according to a first embodiment of the present invention, wherein FIG. 1 shows the structure of a fuel supply section in the form of a high pressure pump and its surroundings, and FIG. 2 shows the structure of the internal combustion engine and its surroundings with a focus placed on one of engine cylinders.

In FIG. 1, a low pressure pump 2 for drawing up and feeding fuel is arranged in a fuel tank 1, and a fuel filter 3 is arranged at a location downstream of the low pressure pump 2.

Also, a pressure regulator 4 and a high pressure pump 5 are arranged on fuel piping at locations downstream of the fuel filter 3, so that the pressure of the fuel passing through the filter 3 is adjusted by the pressure regulator 4 to be introduced into the high pressure pump 5.

The high pressure pump 5 constitutes the fuel supply control section, and it is provided with a pair of check valves 6 arranged on the fuel piping, a piston 7 slidably received in a cylinder interposed between the check valves 6 for pressurizing a booster chamber 8 defined therein, and a spill valve 9 for opening and closing the booster chamber 8.

One end of the piston 7 abuts against a pump cam 10 that is coupled with a camshaft 17 for intake valves of the internal combustion engine for integral rotation therewith, so that the driving force of the internal combustion engine is supplied to the piston 7 through the camshaft 17 and the pump cam 10 in synchronization with the rotation of the internal combustion engine.

The spill valve 9 includes a valve portion 9a adapted to be inserted to close or released to open the booster chamber 8, bypass piping 9b for selectively bypassing or connecting between an upstream portion of the fuel piping and the booster chamber 8 under the action of the valve portion 9a, a coil 9c adapted to be excited by an ECU (electronic control unit) 20 to drive the valve portion 9a to be released, and a compression spring 9d for urging the valve portion 9a to be inserted in a closing direction (i.e., in a downward direction in FIG. 1).

A plurality of injectors 12, being in fluid communication with a downstream portion of the high pressure pump 5, are installed on the cylinders of the internal combustion engine, respectively, in such a manner that each injector 12 is presented in a combustion chamber 11 defined in each cylinder. The high pressure fuel compressed by the high pressure pump 5 is introduced into the injectors 12 through a fuel rail 13 which is fluid communication an output end of the high pressure pump 5.

A release valve 14 for releasing the compressed fuel and a fuel pressure sensor 15 for detecting the pressure (fuel pressure) PF of the fuel are arranged on the fuel rail 13. The fuel pressure PF thus detected by the fuel pressure sensor 15 is input to the ECU 20.

The camshaft 17 is operatively connected through a timing belt with a crankshaft 16, which is driven to rotate by the internal combustion engine, in such a manner that the camshaft 17 is thereby rotated in synchronization with the crankshaft 16 at a rotation ratio of ½ with respect to the crankshaft 16. A crank angle sensor 18 and a cam angle sensor 19 are arranged in opposition to the crankshaft 16 and the camshaft 17, respectively. A crank angle signal SGT and a cam angle signal SGC, being generated by the crank angle sensor 18 and the cam angle sensor 19, respectively, are input to the ECU 20.

The ECU 20 takes in not only the fuel pressure PF, the crank angle signal SGT and the cam angle signal SGC but also operating condition information from a variety of kinds of sensors (not shown), and controls to drive the low pressure pump 2, the coil 9c in the spill valve 9 and the injectors 12.

The high pressure pump (fuel supply section) 5 includes a suction stroke and a discharge stroke that synchronize with the rotation of the crankshaft 16 and the camshaft 17.

The ECU 20 includes an effective stroke changing section for changing an effective stroke related to the discharge stroke of the high pressure pump 5. The effective stroke changing section operates in synchronization with the crank angle signal SGT and the cam angle signal SGC so as to change the effective stroke based on the cam angle signal SGC.

The piston 7 in the high pressure pump 5 is driven to move vertically in accordance with the rotation of the pump cam 10, whereby the volume of the booster chamber 8 is changed to force the compressed fuel therein to be introduced into the fuel rail 13.

At this time, the amount of fuel introduced into the fuel rail 13 is adjusted by the spill valve 9 under the control of the ECU 20.

When the control signal from the ECU 20 is turned on to energize the coil 9c in the spill valve 9, the valve portion 9a is caused to move upwardly under the action of the coil 9c while overcoming the urging force of the compression spring 9d, whereby the valve portion 9a of the spill valve 9 is released or opened.

When the valve portion 9a is opened, the booster chamber 8 is placed into communication through the bypass piping 9b with the fuel piping at its suction side, so that the compression fuel in the booster chamber 8 returns to the suction-side, and is not sent to the fuel rail 13 side. Accordingly, the compressed fuel is not discharged from the high pressure pump 5 to the fuel rail 13.

On the other hand, when the energization of the coil 9c is interrupted, the valve portion 9a is forced to move downwardly by the urging force of the compression spring 9d, whereby the valve portion 9a is closed.

When the valve portion 9a is closed, communication between the booster chamber 8 and the suction side piping is interrupted so that the compressed fuel in the booster chamber 8 is sent to the fuel rail 13 side.

When the fuel pressure PF in the fuel rail 13 increases to reach a valve opening pressure for the release valve 14, the release valve 14 is opened to return the fuel in the fuel rail 13 in to the fuel tank 1.

The fuel pressure PF in the fuel rail 13 is detected by the fuel pressure sensor 15 and sent to the ECU 20, so that feedback control or the like is carried out by the ECU 20. Here, note that the injectors 12 serve to supply the high pressure fuel in the fuel rail 13 directly to the corresponding combustion chambers 11 of the internal combustion engine.

In FIG. 2, the same or like parts or elements as those described above (see FIG. 1) are identified by the same symbols while omitting a detailed description thereof.

A sensor plate 18a for detecting a crank angle (i.e., the rotational angle or position of the crankshaft 16) is mounted on the crankshaft 16 for integral rotation therewith. The sensor plate 18a has a plurality of protrusions (not shown) formed on the outer peripheral portion thereof so as to correspond to prescribed crank angle positions.

When each protrusion on the sensor plate 18a crosses the crank angle sensor 18, the crank angle sensor 18 generates a crank angle signal SGT in the form of a pulse corresponding to the rotational position of the crankshaft 16.

An intake pipe 22 and an exhaust pipe 23 are connected with the combustion chambers 11 of the internal combustion engine 21 through intake valves and exhaust valves, respectively.

An air cleaner 24 for purifying intake air sucked into the internal combustion engine 21, and an air flow sensor 25 for measuring an amount of intake air sucked into the internal combustion engine 21 are connected with one end of the intake pipe 22, and a throttle valve 26 is arranged in the intake pipe 22 for increasing and decreasing the amount of intake air so as to adjust the output power of the internal combustion engine 21.

A spark plug 28 adapted to be driven to discharge by an ignition coil 27 is mounted on each cylinder with its one end presented in a corresponding combustion chamber 11 of the internal combustion engine 21.

The ignition coil 27 supplies high voltage energy to the spark plugs 28 by its energization being interrupted under the control of the ECU 20, so that each spark plug 28 generates a spark to fire the air fuel mixture in a corresponding combustion chamber 11 of the internal combustion engine 21.

The injectors 12 serve to supply an amount of fuel corresponding to the amount of intake air measured by the air flow sensor 25 directly to the corresponding combustion chambers 11.

The exhaust pipe 23 discharges to the ambient atmosphere exhaust gases that are resulted from the combustion of the air fuel mixture in the combustion chambers 11.

An oxygen sensor 29 is mounted on the exhaust pipe 23 for detecting an amount of residual oxygen contained in the exhaust gases, and a three way catalyst 30 is also mounted on the exhaust pipe 23 for purifying harmful gases (THC, CO, NOx) contained in the exhaust gases.

On the other hand, a valve timing control device in the form of an actuator 31 is mounted on the camshaft 17 for variably controlling the opening and closing timings of the intake valve or the exhaust valve.

The actuator 31 is adjusted and driven by an oil control valve 32 (hereinafter simply referred to as "OCV") under the control of the ECU 20 so as to variably sets the relative phase of the cam angle with respect to the crank angle.

The OCV 32 serves to control the relative phase of the cam angle to the crank angle by switching or changing the oil pressure supplied to the variable cam phase actuator 31.

The cam angle sensor 19 includes a sensor plate with protrusions (not shown) which is coupled with the camshaft 17 for integral rotation therewith so as to generate a cam angle signal SGC, as in the case of the crank angle sensor 18.

The ECU 20 controls a variety of actuators including not only those related to the low pressure pump 2 in the fuel tank 1, the high pressure pump 5, the injectors 12, the ignition coil 27 and the OCV 32 but also those related to the internal combustion engine 21 based on the input information (the operating condition of the internal combustion engine 21) from a variety of kinds of sensors.

Figure 3:
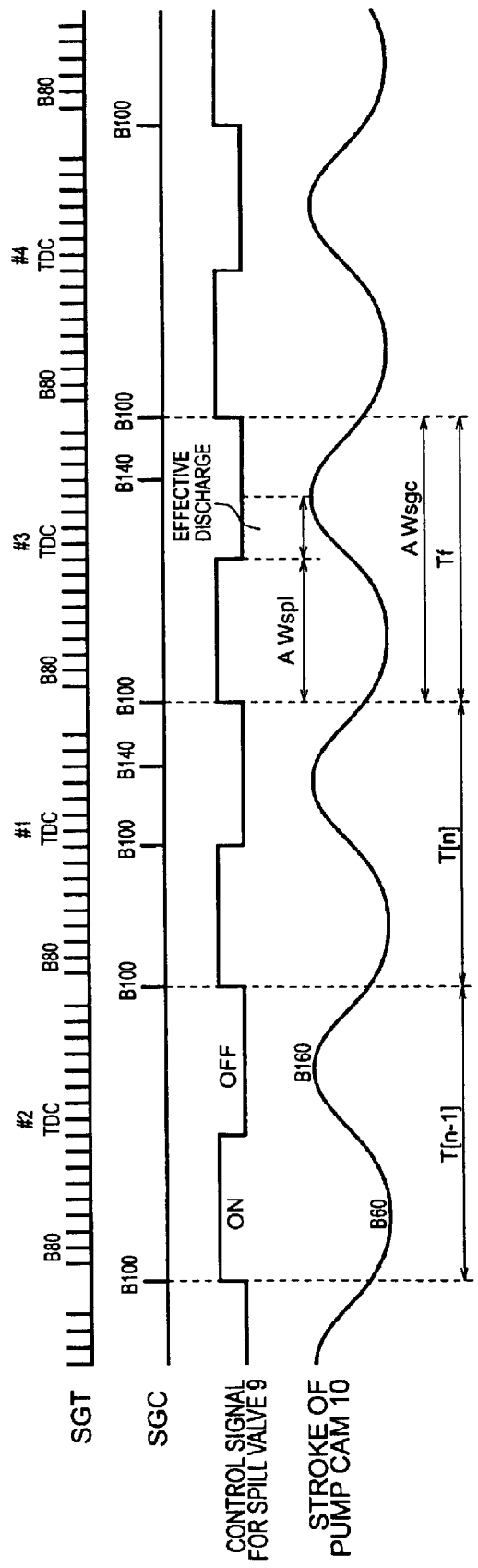
FIG. 3 is a timing chart showing the operation of the fuel supply control apparatus when the valve timing is controlled to be at the most retard angle, according to the first embodiment of the present invention.

FIG. 3 is a timing chart that shows the operation of the fuel supply control apparatus when the valve timing is controlled to be at the most retard angle according to the first embodiment of the present invention. More specifically, FIG. 3 illustrates the interrelation among the crank angle signal SGT, the cam angle signal SGC, the control signal supplied to the coil 9c in the spill valve 9, and the stroke (driving state) of the pump cam 10.

In FIG. 3, the control signal for the spill valve 9 is turned on according to the cam angle signal SGC, and the ON period of the control signal is decided by using a period AWsgc (180 [degCA]) between pulses of the cam angle signal SGC.

The estimated next period Tf of the cam angle signal SGC is calculated by adding a value obtained by subtracting the last period T[n−1] from the current period T[n] to the current period T[n], as will be described later.

In addition, the ON duration time of the spill valve 9 calculated by first dividing the estimated period Tf by the interpulse angle AWsgc of the cam angle signal SGC, and then multiplied by the ON duration angle AWspl of the spill valve 9.

The spill valve 9 is opened to place the booster chamber 8 into communication with the suction side of the fuel piping when the control signal is turned on, and hence only the time when the control signal is turned off contributes to the effective stroke for discharging the fuel.

The crank angle signal SGT is a pulse signal comprising a train of Pulses each rising at a crank angle of 10 [degCA], and includes "untoothed portions" which generate no pulse signal at locations corresponding to prescribed crank angle positions of the respective cylinders (#1—#4).

That is, the crank angle signal SGT has untoothed portions at crank angle positions B100 (i.e., 100 [degCA] before top dead center TDC) with respect to cylinders #1, #4, and it also has untoothed portions at crank angle positions B100 and B110 (i.e., 100 and 110 [degCA] before top dead center TDC) with respect to cylinders #2, #3.

The cam angle signal SGC is a pulse signal comprising a train of pulses each rising at a prescribed crank angle position of B100 for each cylinder and additional pulses each rising at a crank angle position of B140 (i.e., 140 [degCA] before top dead center TDC) with respect to cylinders #3, #4.

The piston 7 (see FIG. 1) of the high pressure pump 5 moves upward according to the rising slope of the pump cam 10 (see the waveform in FIG. 3). At this time, the high pressure pump 5 becomes a discharge stroke so that the volume of the booster chamber 8 is thereby reduced to compress the fuel therein.

When the control signal for the spill valve 9 is in the ON state on the discharge stroke of the high pressure pump 5, the spill valve 9 is opened to return the fuel to the suction side, as described above, so the fuel is not discharged to the fuel rail 13 side.

Accordingly, even if the high pressure pump 5 is on the discharge stroke, the spill valve 9 is closed only when the turn-off requirement of the control signal for the spill valve 9 is satisfied, so that an effective discharge of the fuel to the fuel rail 13 side can be carried out (see FIG. 3).

The control signal for the spill valve 9 is turned on by a pulse B100 of the cam angle signal SGC, and then turned off after an ON time calculated from the amount of fuel required has elapsed.

The amount of effective pump discharge is controlled by adjusting the ON/OFF period of the spill valve 9, whereby the fuel pressure PF in the fuel rail 13 can be controlled.

That is, the fuel pressure control section in the ECU 20 turns on the spill valve 9 at an angle or position of B100 of the cam angle signal SGC, and turns off the spill valve 9 at the timing corresponding to the amount of discharge calculated.

At this time, the effective discharge stroke of the piston 7 becomes from its position taken when the spill valve 9 is turned off to its position taken at the top position of B150 of the pump cam 10.

Specifically, the pulse position (sensor plate tooth position) of B100 of the cam angle signal SGC, which becomes the control timing of the spill valve 9, is arranged on the suction stroke from the top position of B150 of the pump cam 10 to the bottom position of B60 (i.e., 60 [degCA] before top dead center TDC), and the spill valve 9 is turned on at its control position of B100, and only the turn-off timing for the spill valve 9 is controlled by a timer.

Here, note that the spill valve 9 may be in an open state or in a closed state in the course of the suction stroke from the top position of B150 to the bottom position of B60 of the pump cam 10. Accordingly, it is preferred that the coil 9c of the spill valve 9 be turned on to open the spill valve 9 during the suction stroke of the high pressure pump 5.

As a result, only the timing at which the coil 9c of the spill valve 9 is turned off has to be controlled by the timer, so control accuracy becomes excellent even with the use of simple control.

Figure 4:
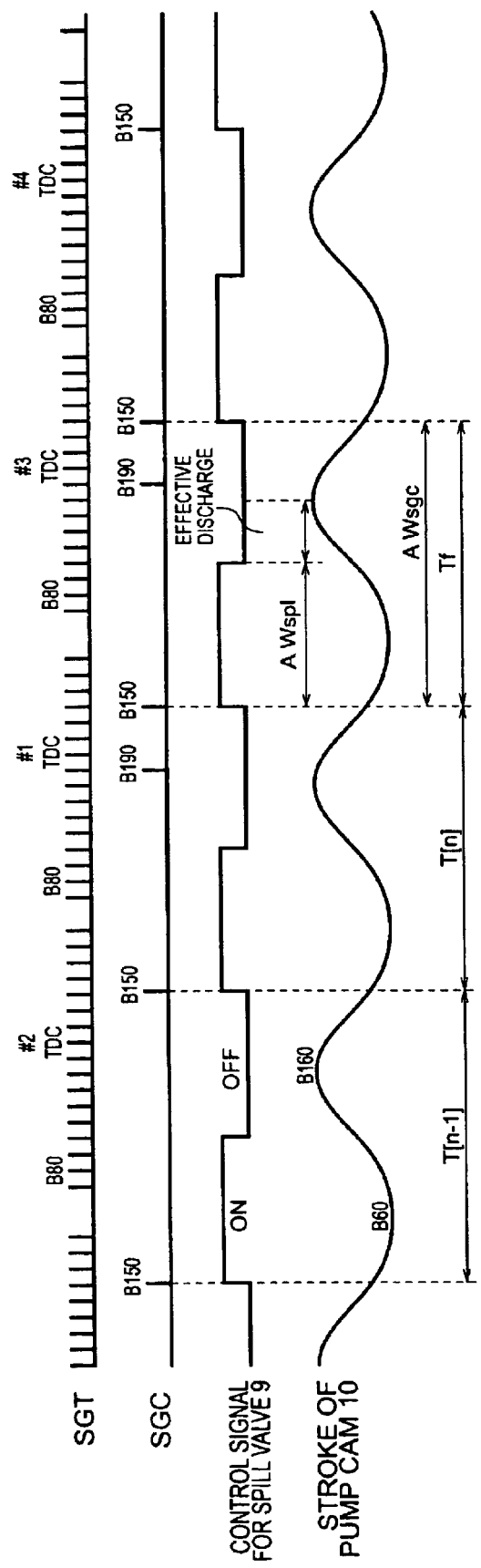
FIG. 4 is a timing chart showing the operation of the fuel supply control apparatus when the valve timing is controlled to be at the most advance angle, according to the first embodiment of the present invention.

FIG. 4 is a timing chart that shows the operation of the fuel supply control apparatus when the valve timing is controlled to be at the most advance angle according to the first embodiment of the present invention.

In this case, it is assumed that the actuator 31 for valve timing adjustment (for variable cam phase) can be advanced in its control angle up to a crank angle of 50 [degCA].

In FIG. 4, the most advance angle position of the relative phase of the cam angle with respect to the crank angle is the position advanced by a crank angle of 50 [degCA] from the most retard angle position, in accordance with which the position of the cam angle signal SGC and the timing of the pump cam 10 are set.

That is, the cam angle signal SGC comprises a pulse signal rising at a prescribed crank angle position of B150 for each cylinder (i.e., 150 [degCA] before top dead center TDC), with a pulse rising at a crank angle position of B190 (i.e., 190 [degCA] before top dead center TDC) being added with respect to cylinder #3, #4.

At this time, the control signal for the spill valve 9 is turned on and off by the cam angle signal SGC, and hence the control timing of the spill valve 9 is similarly shifted or changed along with a shift of the operational position of the pump cam 10 according to a change in the valve timing. As a result, it is not necessary to do any particular correction upon change of the valve timing.

Figure 5:
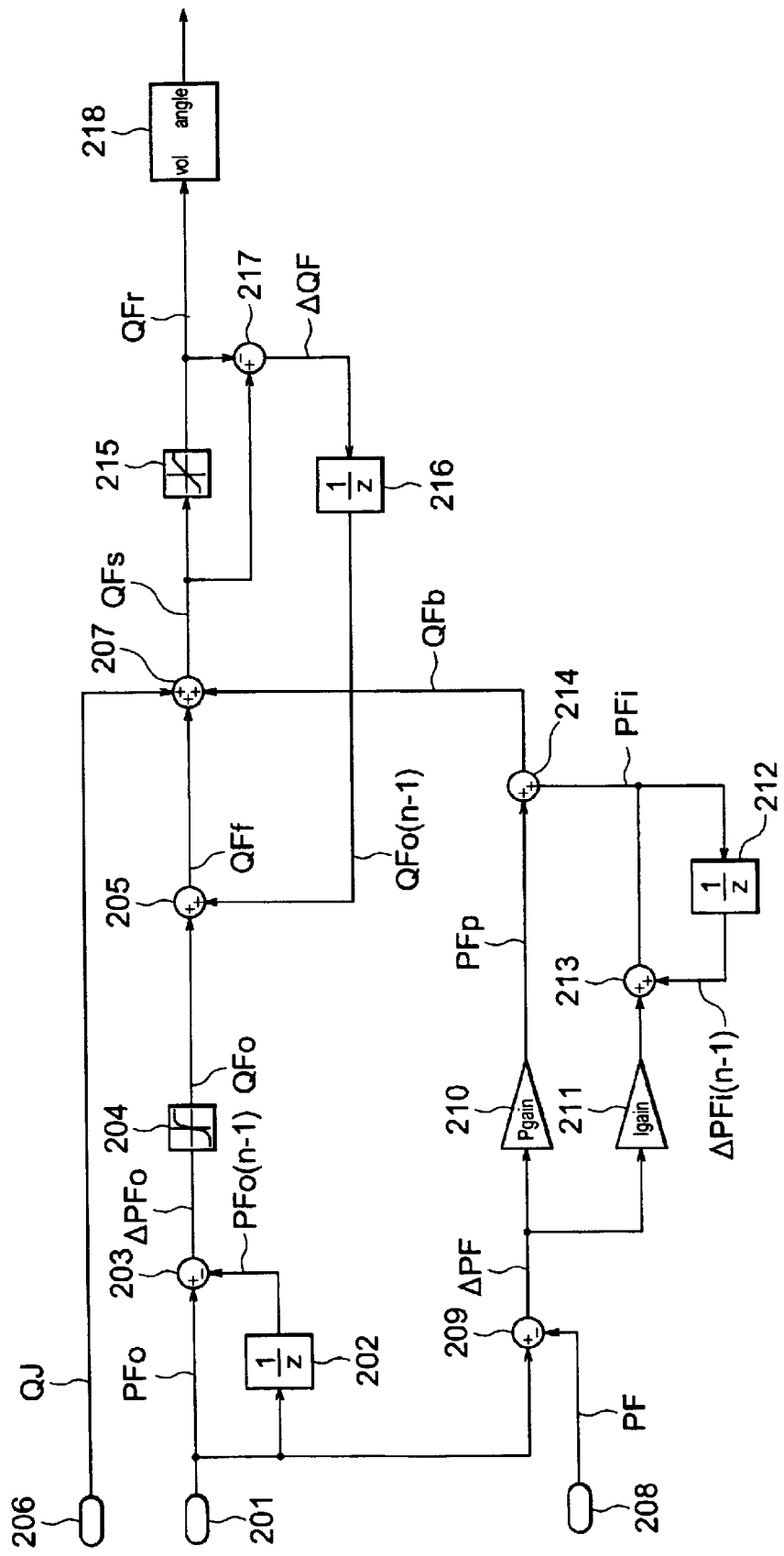
FIG. 5 is a functional block diagram schematically showing a fuel pressure control section of the fuel supply control apparatus according to the first embodiment of the present invention.

FIG. 5 is a functional block diagram that schematically shows the fuel pressure control section according to the first embodiment of the present invention.

The fuel pressure control of the high pressure pump 5 shown in FIG. 5 is executed by the ECU 20 at each control timing of the spill valve 9 according to the cam angle signal SGC.

In FIG. 5, the fuel pressure control section in the ECU 20 includes a target fuel pressure calculation section 201 for calculating a target fuel pressure PFo in accordance with a change in the operating condition of the internal combustion engine 21, a delay circuit 202 for calculating the last target fuel pressure PFo(n−1), a subtraction section 203 for calculating a target fuel pressure deviation ΔPFo (=PFo−PFo(n−1)) between the target fuel pressure PFo and the last target fuel pressure PFo(n−1), an LUT (lookup table) 204 used as a map in calculating an amount of pump discharge QFo from the target fuel pressure deviation ΔPFo, an adding section 205 for adding the current amount of pump discharge QFo and the last amount of pump discharge QFo(n−1) (to be carried over) to each other to calculate an amount of feedforward QFf, an injector flow rate calculation section 206 for calculating a flow rate QJ of each injector, and an adding section 207 for adding the amount QFf of feedforward, the flow rate QJ of each injector, and the amount of feedback QFb to one another to calculate a total amount of discharge QFs.

The fuel pressure control section includes a fuel pressure input section 208 in which the fuel pressure PF detected by the fuel pressure sensor 15 is taken, a subtraction section 209 for calculating a fuel pressure deviation ΔPF (=PFo−PF) between the target fuel pressure PFo and the fuel pressure PF actually detected, a proportional calculation section 210 and an integral calculation section 211 for applying arithmetic calculations to the fuel pressure deviation ΔPF by using a proportional gain Pgain and an integral gain Igain, a delay circuit 212 for calculating the last integral value PFi(n−1), an adding section 213 for adding an output value of the integral calculation section 211 and the last integral value PFi(n−1) with each other to calculate an integrated amount PFi, an adding section 214 for calculating the amount of feedback QFb by adding the integrated amount PFi and a proportional amount PFp calculated by the proportional calculation section 210, a calculation section 215 for calculating a current amount of discharge QFr from the total amount of discharge QFs by using the map, a delay circuit 216 for calculating the last amount of pump discharge QFo(n−1) carried over from the discharge amount deviation ΔQF (the next amount to be carried over), a subtraction section 217 for calculating the discharge amount deviation ΔQF (=QFs−QFr) between the total amount of discharge QFs and the current amount of discharge QFr, and a control signal generation section 218 for converting the current amount of discharge QFr into a control angle φs for the spill valve 9 (corresponding to a control signal for the coil 9c).

Figure 6:
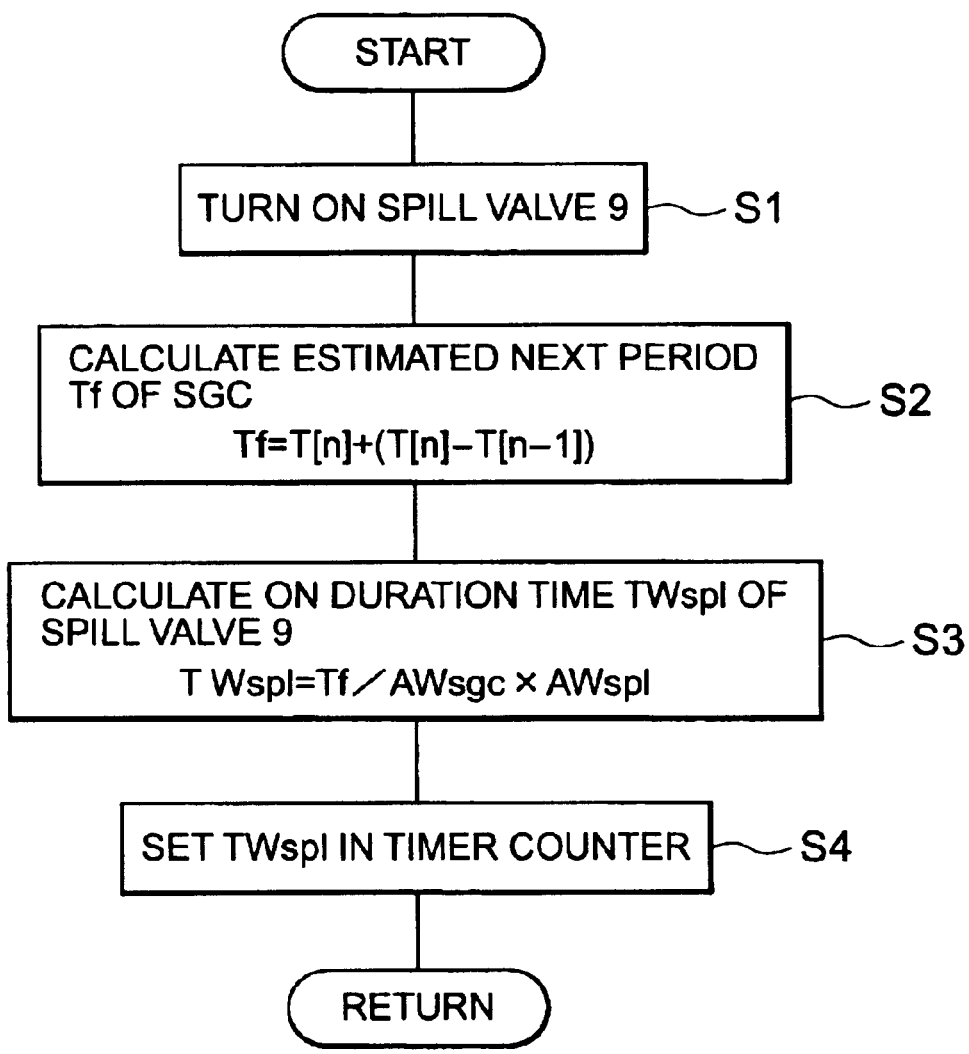
FIG. 6 is a flow chart showing concrete contents of the control related to a control angle φs in the fuel supply control apparatus according to the first embodiment of the present invention.

FIG. 6 is a flow chart that shows the concrete content of the control related to the control angle φs.

In FIG. 6, first of all, the ECU 20 turns on the control signal for the spill valve 9 (step S1).

Subsequently, the value obtained by subtracting the last interpulse period T[n−1] of the cam angle signal SGC from the current interpulse period T[n] thereof is added to the current interpulse period T[n] to calculate the estimated next period Tf as shown in the following expression (8) (step S2).

$$Tf = T[n] + (T[n] - T[n-1]) \qquad (8)$$

Thereafter, the estimated period Tf is divided by the interpulse angle AWsgc of the cam angle signal SGC, and then multiplied by the ON duration angle AWspl of the spill valve 9 to calculate an ON duration time TWspl of the spill valve 9, as shown in the following expression (9) (step S3).

$$TWspl = Tf / AWsgc \times AWspl \qquad (9)$$

Finally, the ON duration time TWspl of the spill valve 9 calculated by expression (9) above is set in a timer counter (step S4), and a return is carried out while ending the processing routine of FIG. 6.

Hereinafter, the timer counter thus set is decremented, and after the countdown has been completed to reach the ON duration time TWspl (i.e., the set time has elapsed), the spill valve 9 is turned off.

The interpulse angle AWsgc of the cam angle signal SGC is a crank angle of 180 [degCA].

Thus, by controlling the spill valve 9 by the use of the cam angle signal SGC having pulses arranged at equal intervals, the same arithmetic calculation method can be applied irrespective of the strokes of the high pressure pump 5, i.e., whether the suction stroke or the discharge stroke.

Although the interpulse angle AWsgc of the cam angle signal SGC is a crank angle of 180 [degCA], a manufacturing error of about ±1 [degCA] will take place owing to the machining variation of the sensor plate of the cam angle sensor 19.

If no action such as correction is taken on such a machining variation, the control timing of the spill valve 9 will be varied, thus making it impossible to control the fuel pressure so as to coincide with the target fuel pressure PFo.

Accordingly, in order to maintain highly accurate control on the fuel pressure, correction processing is carried out so as to counterbalance the machining variation of the sensor plate of the cam angle sensor 19.

For instance, when the period of the crank angle signal SGT is constant, the rotational speed of the internal combustion engine 21 is also constant, and hence the periodic change of the cam angle signal SGC can be considered to be a variation due to the error of the sensor plate of the cam angle sensor 19.

Therefore, by adding or subtracting the periodic change (error component) of the cam angle signal SGC detected when the period of the crank angle signal SGT is constant, at the time of calculating the ON duration time TWspl of the spill valve 9, it is possible to correct the sensor plate manufacturing error of the cam angle sensor 19 and the like.

Thus, by controlling the opening and closing timings of the spill valve 9 by the use of the cam angle signal SGC, it becomes unnecessary to make corrections during the valve timing control in the case of using the crank angle signal SGT, whereby it is possible to control the fuel pressure with high accuracy without making particular corrections with respect to the valve timing change. Consequently, such control can be simplified while ensuring satisfactory controllability.

In addition, the next opening and closing timings of the spill valve 9 are controlled by estimating and calculating the estimated period Tf of the cam angle signal SGC. As a result, stable fuel pressure controllability can be ensured in the transient of the internal combustion engine 21, so the fuel pressure can be controlled with high accuracy.

Moreover, by controlling the spill valve 9 based on the pulses at equal intervals of the cam angle signal SGC, it becomes unnecessary to make corrections due to the variation in the position of arrangement of the cam angle sensor 19. As a consequence, there is no need to make correction for each pulse of the cam angle signal SGC, thus making it possible to perform the fuel pressure control with high accuracy.

Further, since the cam angle signal SGC for controlling the spill valve 9 is arranged on the suction stroke of the high pressure pump 5, the amount of discharge of the high pressure pump 5 can be adjusted by controlling only one of the start and the end of the effective discharge of the high pressure pump 5, thus making it possible to simplify the control without reducing fuel pressure controllability.

Furthermore, since the untoothed portion of the sensor plate 18a is arranged on the suction stroke of the high pressure pump 5, it is possible to improve accuracy in correcting the control timing of the spill valve 9 by the crank angle signal SGT.

Still further, the opening and closing timing of the spill valve 9 is adjusted by correcting variation in the output timing of the cam angle signal SGC resulting from the machining variation of the protrusions of the sensor plate of the cam angle sensor 19 generated upon manufacture thereof, whereby the opening and closing timing variation of the spill valve 9 due to the output position variation of the cam angle signal SGC can be corrected, thus making it possible to perform stable fuel pressure control with high accuracy.

Besides, since accuracy in the fuel pressure control is improved, the combustion in the internal combustion engine 21 can be made stable, thereby improving the composition of exhaust emissions, fuel consumption and driveability.
Embodiment 2.

In the above-mentioned first embodiment, no consideration is given to an operation delay time (dead time) from the ON/OFF timing of the control signal until the valve portion 9a of the spill valve 9 actually performs the ON/OFF operation, but the processing of avoiding the generation of control errors due to the dead time may be carried out.

Now, the operation of a fuel supply control apparatus for an internal combustion engine according to a second embodiment of the present invention will be described while referring to flow charts of FIGS. 7 through 11.

In FIG. 7 through FIG. 10, a current value and a stroke (i.e., 0%–100%) of the spill valve 9 changing in response to the control signal (ON/OFF) of the spill valve 9 are shown together with dead times $\tau1$, $\tau1a$–$\tau1c$, and $\tau2$.

Figure 7:
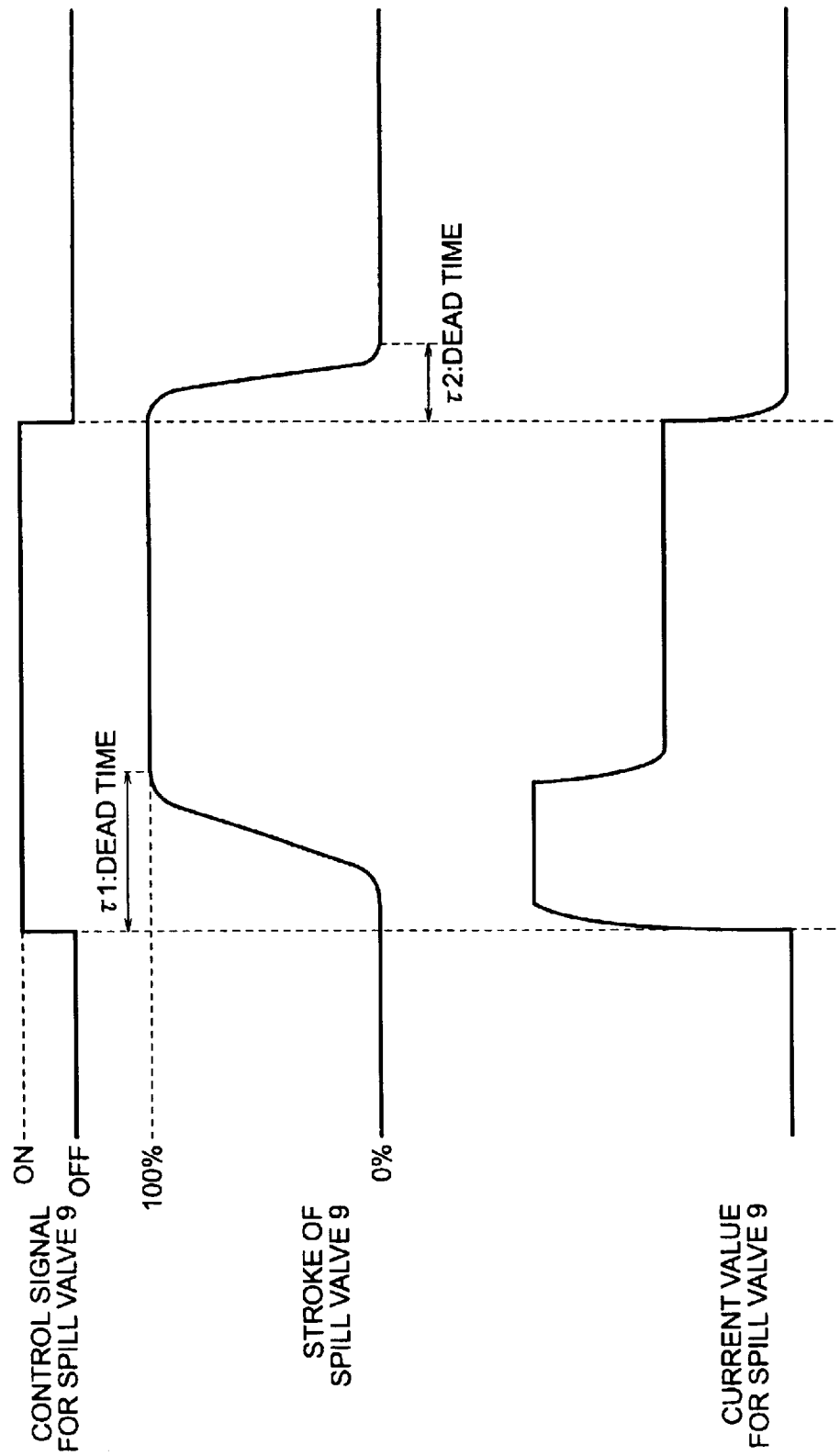
FIG. 7 is a timing chart showing the state in which a fuel pressure control error is generated due to a dead time τ1 in a fuel supply control apparatus for an internal combustion engine according to a second embodiment of the present invention.
Figure 8:
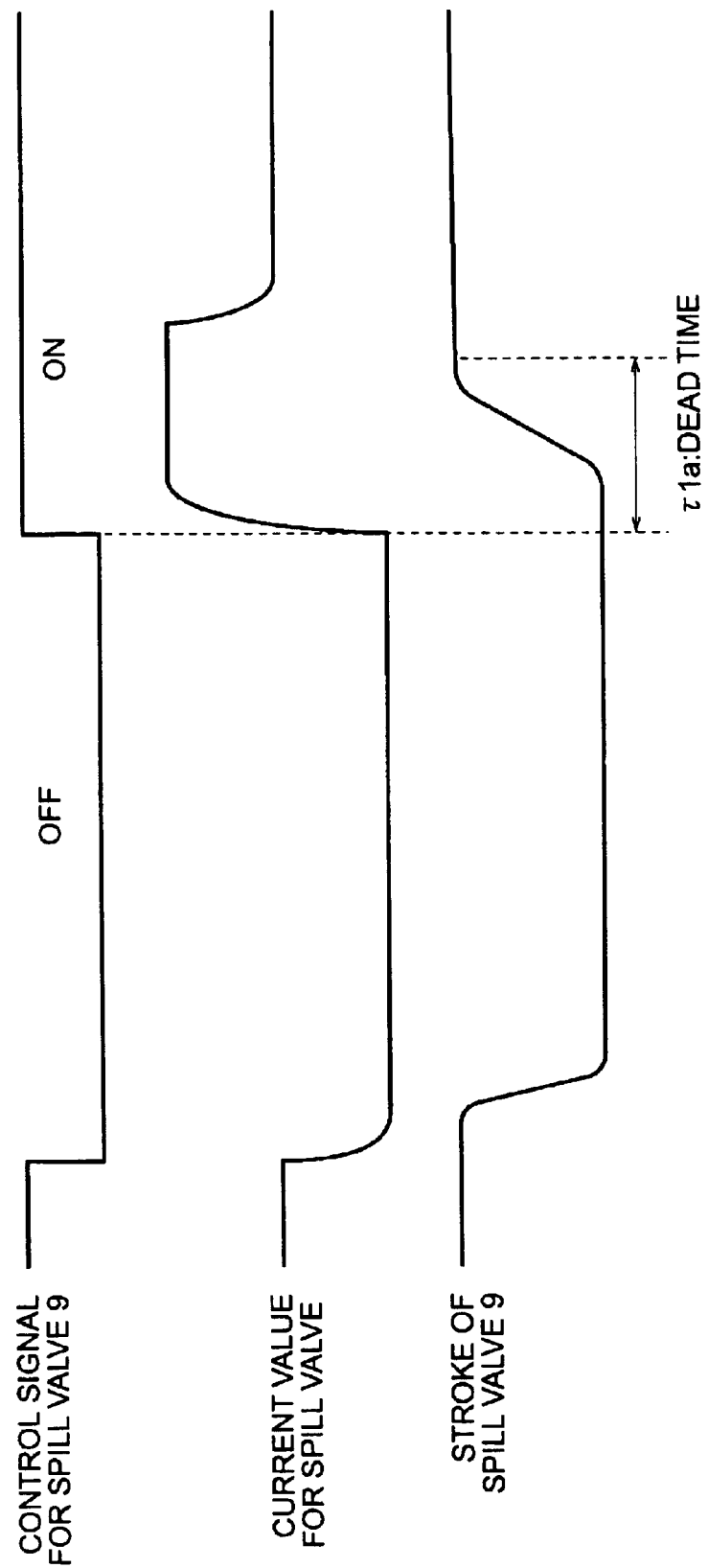
FIG. 8 is a timing chart showing the state in which a countermeasure against a dead time $\tau 1a$ is taken in the fuel supply control apparatus according to the second embodiment of the present invention.
Figure 9:
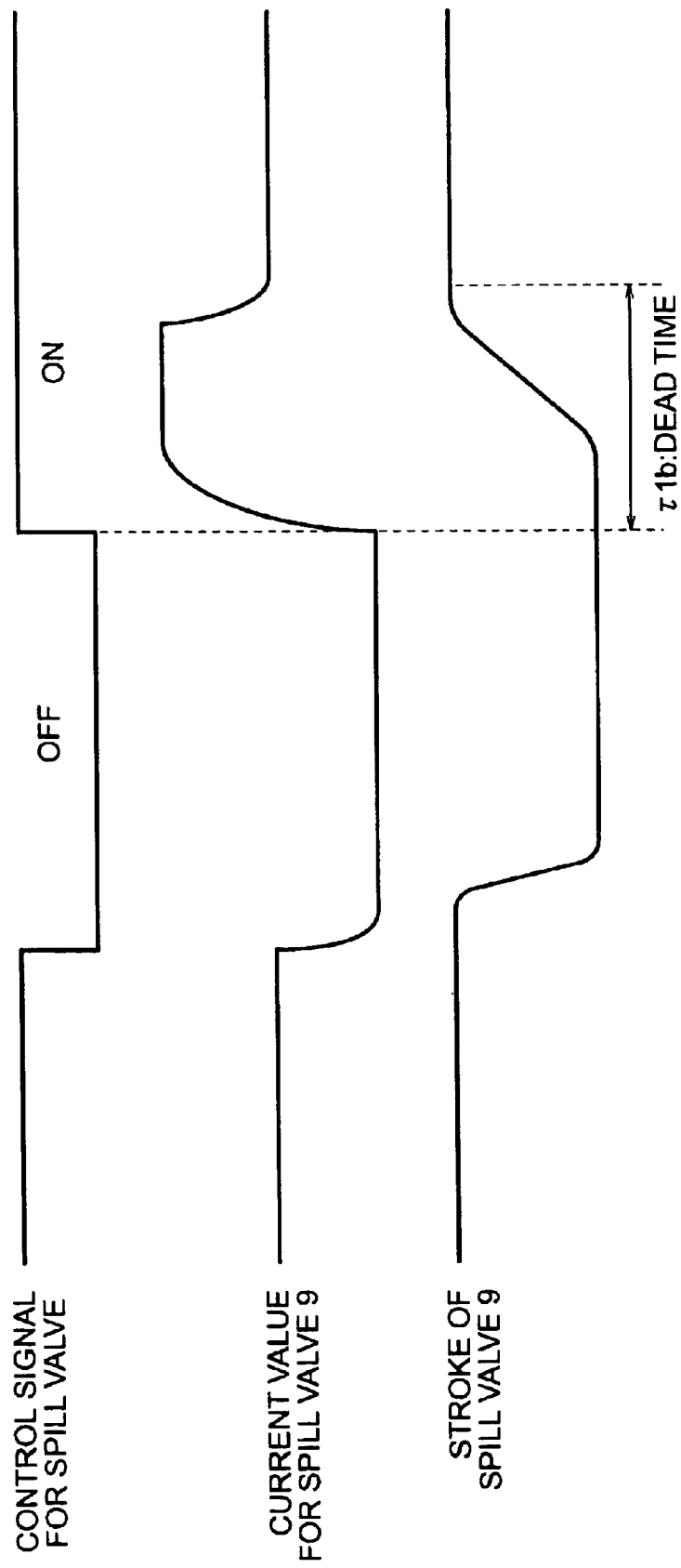
FIG. 9 is a timing chart showing the state in which a countermeasure against a dead time $\tau 1b$ is taken in the fuel supply control apparatus according to the second embodiment of the present invention.
Figure 10:
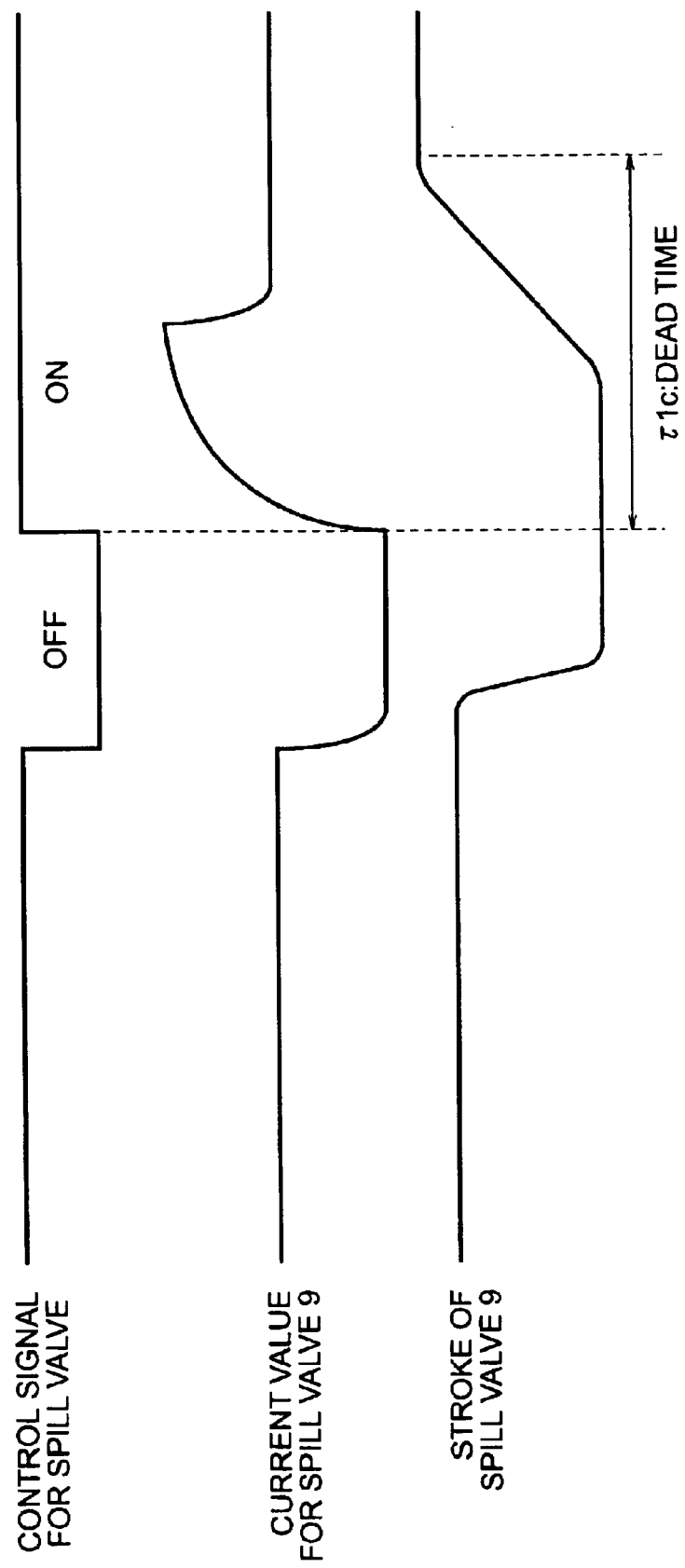
FIG. 10 is a timing chart showing the state in which a countermeasure against a dead time $\tau 1c$ is taken in the fuel supply control apparatus according to the second embodiment of the present invention.

FIG. 7 shows the state in which a fuel pressure control error is generated by the dead time $\tau1$, and FIG. 8 through FIG. 10 show the state in which an appropriate measure is taken against the dead times $\tau1a$–$\tau1c$.

As described above (see FIG. 3), by turning on the spill valve 9 at a pulse position of B100 of the cam angle signal SGC, and turning off the spill valve 9 at the timing corresponding to a calculated amount of pump discharge, the stroke of the piston 7 from the turning off of the spill valve 9 to the top position of B150 of the pump cam 10 becomes an amount of effective discharge.

In addition, the control position of B100 of the spill valve 9 is arranged on the suction stroke so that the spill valve 9 is turned on at the control position of B100, whereas the spill valve 9 is turned off by timer control. In this case, since the spill valve 9 may be either in an open state or in a closed state on the suction stroke, the spill valve 9 is turned on during the suction stroke, and only the turn-off timing of the spill valve 9 is controlled by a timer.

As shown in FIG. 7, the spill valve 9 has dead times $\tau1$, $\tau2$ from the turning on or turning off of the control signal to the time when the valve portion 9a is actually operated.

The dead times $\tau1$, $\tau2$ are time elements, which appear as changes in the rotational speed of the internal combustion engine 21 with respect to the crank angle (or the cam angle).

For instance, in case where the dead time $\tau1$, from the time the control signal for the spill valve 9 has been turned on to the time the spill valve 9 is actually turned on, is 1 msec, a crank angle of 36 [degCA] will elapse for the dead time $\tau1$ when the rotational speed of the internal combustion engine 21 is 6,000 rpm.

At this time, when the crank angle corresponding to the dead time $\tau1$ is longer than a range from the control position of B100 of the cam angle signal SGC of the spill valve 9 to the bottom position B60 of the pump cam 10, the fuel in the booster chamber 8 is not released or discharged to the suction side but to the fuel rail 13 side for a period of time from the bottom position B60 of the pump cam 10 until the spill valve 9 is actually turned on. Accordingly, the amount of discharge from the high pressure pump 5 increases by an amount corresponding to the dead time $\tau1$, so the accuracy in the fuel pressure control is deteriorated.

Therefore, it is necessary to set the crank angle from the control position of B100 of the spill valve 9 to the bottom position of B60 of the pump cam 10 larger than the crank angle corresponding to the dead time $\tau1$ of the spill valve 9.

Moreover, although in the control of the spill valve 9, provision may be made for a booster circuit in the drive circuit of the spill valve 9 for boosting a battery voltage of 14 [V] to a voltage of 100 [V] so as to drive the spill valve 9. In this case, a long time is required for boosting the battery voltage of 14 [V] to 100 [V].

For instance, the turn-off period of the control signal of the spill valve 9 is long enough in FIG. 8, and hence the voltage for controlling the spill valve 9 can be boosted enough by the time the control signal of the spill valve 9 is turned on, so the dead time $\tau1a$ becomes relatively short.

On the other hand, since the voltage boosting decreases in accordance with the decreasing turn-off period of the control signal for the spill valve 9, for example, from FIG. 8 to FIG. 9 and from FIG. 9 to FIG. 10, the dead time further increases sequentially from $\tau1a$ to $\tau1b$ further thence to $\tau1c$.

For instance, if the rotational speed of the internal combustion engine 21 is 6,000 rpm when the voltage boosting time is 1 msec, the crank angle corresponding to the voltage boosting time 1.2 msec is 43.2 [degCA].

At this time, the crank angle from the top position of B150 of the pump cam 10 to the control position of B100 of the spill valve 9 needs at least 43.2 [degCA].

If the crank angle from the top position of B150 of the pump cam 10 to the control position of B100 of the spill valve 9 is less than or equal to 43.2 [degCA] under the above-mentioned operating condition of the internal combustion engine 21, the dead time during the turn-on period of the spill valve 9 becomes large, thus resulting in a delay in the operation of the spill valve 9. As a result, the spill valve 9 is not able to be released or opened for this delay time (dead time), and hence the amount of discharge of the high pressure pump 5 increases, and accuracy in the fuel pressure control is deteriorated.

However, by setting the turn-off period of the spill valve 9 larger than the crank angle corresponding to the time required for the voltage boosting, a sufficient voltage rise or boost can be obtained, so that an amount of pump discharge as targeted can be obtained. As a consequence, it is possible to avoid deterioration in accuracy of the fuel pressure control, thus making it possible to maintain the control with high accuracy.

That is, by setting the period of time from the pulse timing of the cam angle signal SGC controlling the spill valve 9 to the start of a suction stroke of the high pressure pump 5 (or from the start of the suction stroke of the high pressure pump 5 to a pulse of the cam angle signal SGC controlling the spill valve 9) larger than the dead time due to the response delay of the spill valve 9 (i.e., the period of time until the spill valve 9 becomes able to be controlled with normal response), it is possible to prevent a defective amount of discharge of the high pressure pump 5 due to the response delay of the spill valve 9, thereby making it possible to control the fuel pressure with high accuracy.

Embodiment 3.

Although in the above-mentioned first and second embodiments, no special consideration is given to a periodic change in the rotational speed of the internal combustion engine 21 resulting from the respective strokes thereof (intake, compression, combustion and exhaust), processing may be carried out by taking into consideration such a periodic change in the engine rotational speed due to the respective strokes of the internal combustion engine 21.

Hereinafter, reference will be made to a fuel supply control apparatus for an internal combustion engine according to a third embodiment of the present invention in which a countermeasure is taken against such a periodic change in the engine rotational speed, while referring to flow charts in FIG. 11 and FIG. 12 as well as a timing chart in FIG. 13.

As is well known, in the internal combustion engine 21, a periodic change in the engine rotational speed is generated due to the presence of the respective intake, compression, combustion and exhaust strokes.

For instance, in the case of the internal combustion engine 21 having four cylinders, the angular velocity thereof becomes the smallest at each dead center position (i.e., at top dead center and at bottom dead center), whereas it becomes the greatest substantially at a midpoint between the top and bottom dead centers. Also, the magnitude of such a periodic change varies depending on the load of the internal combustion engine 21.

Therefore, with a method of controlling the fuel pressure simply based on time estimation from the period of each crank angle of 180 [degCA], as described above, there is a fear that control accuracy might be impaired by the influence of the periodic change.

Hereinafter, reference will be made to the control processing according to the third embodiment of the present invention in which the fuel pressure can be controlled with high accuracy even if there exists a periodic change in the engine rotational speed in accordance with the respective operating strokes of the internal combustion engine 21.

Figure 11:
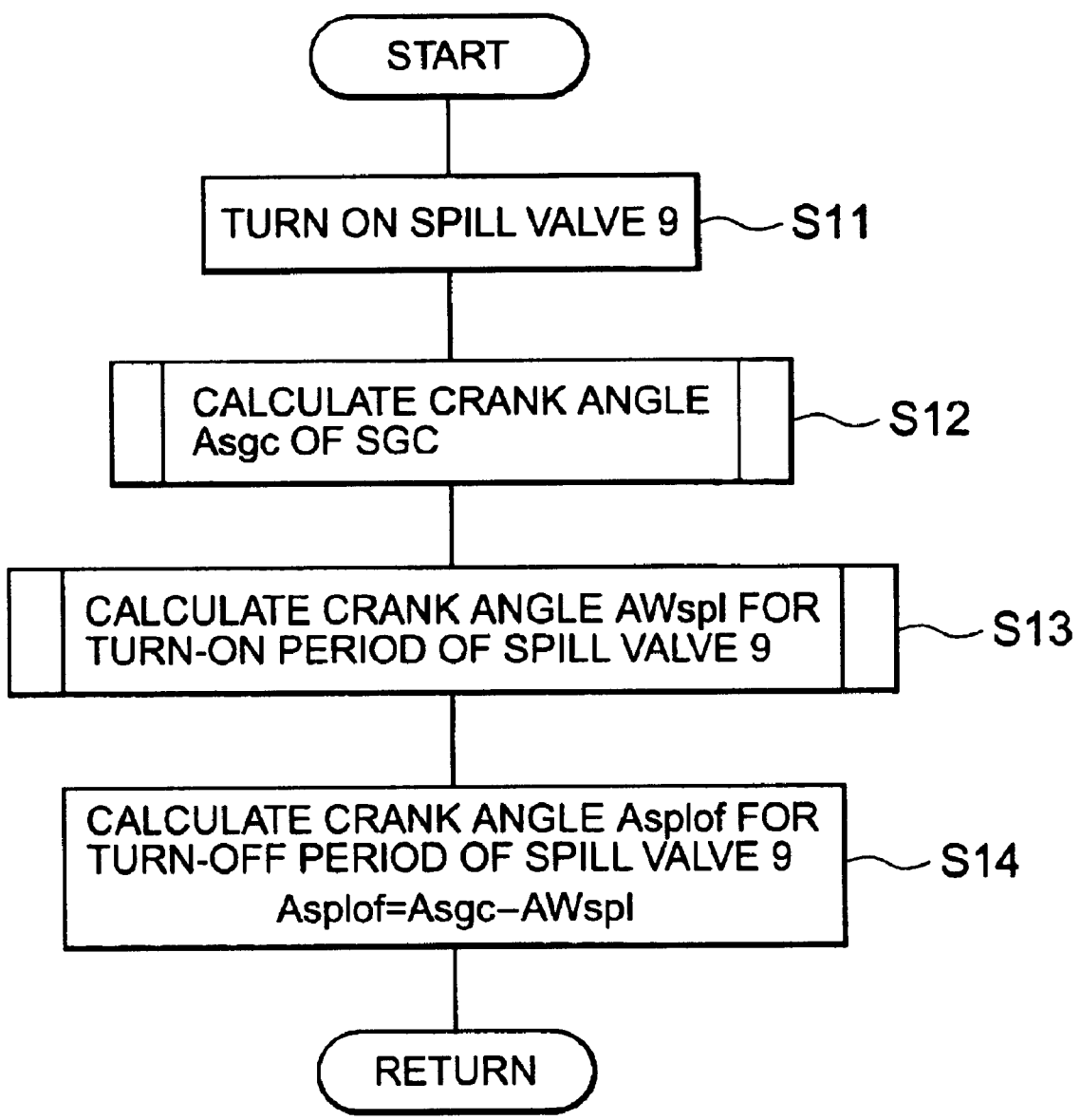
FIG. 11 is a flow chart showing interrupt processing in response to a cam angle signal SGC in a fuel supply control apparatus for an internal combustion engine according to a third embodiment of the present invention.
Figure 12:
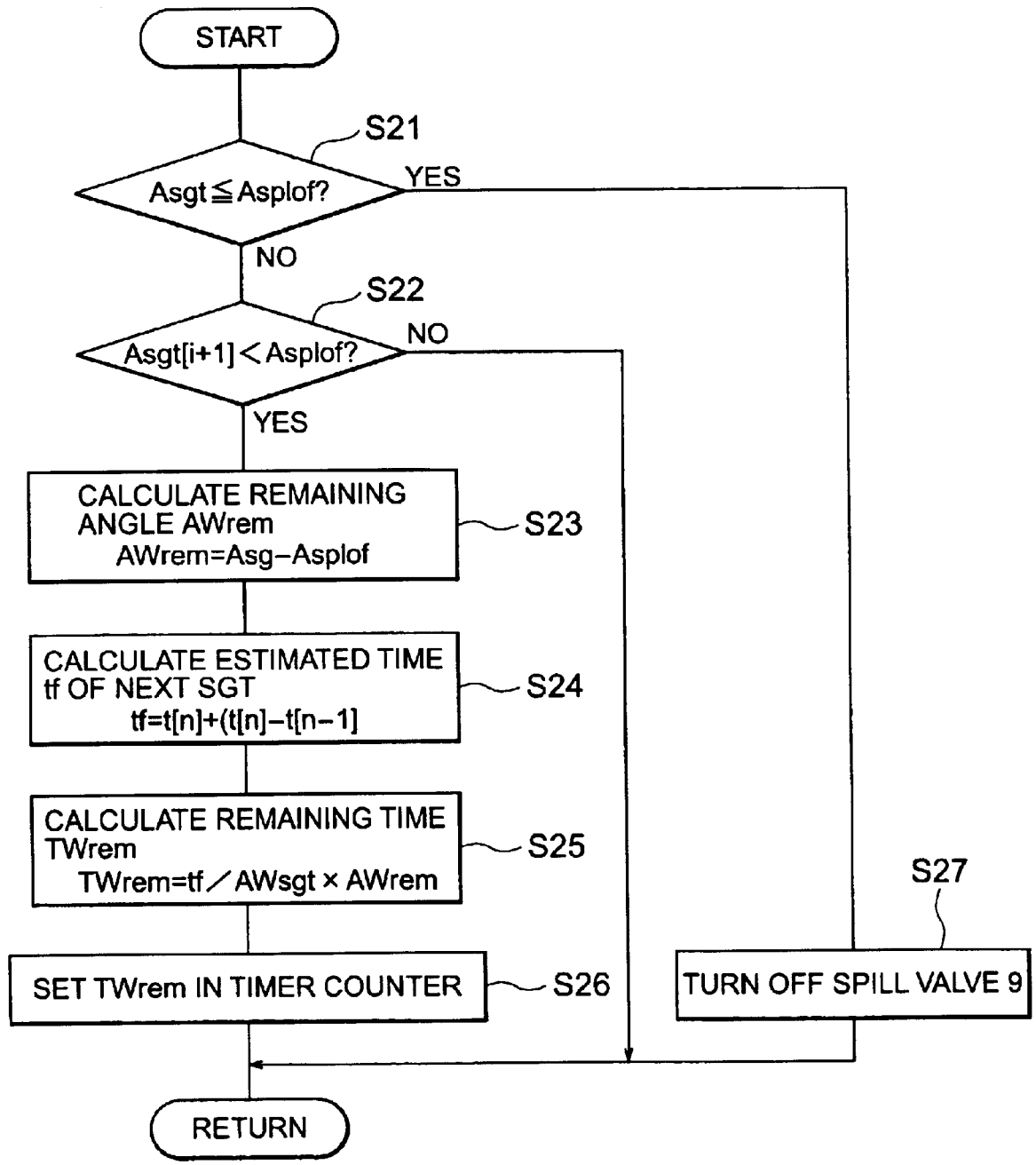
FIG. 12 is a flow chart showing interrupt processing in response to a crank angle signal SGT in the fuel supply control apparatus according to the third embodiment of the present invention.

FIG. 11 and FIG. 12 show the ON/OFF control processing (interrupt processing) of the spill valve 9, in which the interrupt processing in FIG. 11 is executed at each pulse or control position of B100 of the cam angle signal SGC in FIG. 3, and the interrupt processing in FIG. 12 is executed at each pulse timing of the cam angle signal SGC in FIG. 3.

In FIG. 11, first of all, the control signal for the spill valve 9 is placed into an ON state, so that the spill valve 9 is thereby turned on (step S11).

At this time, since the spill valve 9 is placed into a valve-opening state when the control signal is in the ON state, as stated above, fuel is not supplied from the high pressure pump 5 to the fuel rail 13.

Then, a crank angle Asgc of the cam angle signal SGC at which the interrupt processing shown in FIG. 11 is executed is calculated (step S12).

At this time, in order to identify the respective cylinders based on the pulses of the crank angle signal SGT generated at intervals of 10 [degCA], the ECU 20 grasps the crank angle of each pulse of the cam angle signal SGC. In this case, since the untoothed portions are set in the crank angle signal SGT as shown in FIG. 3 or FIG. 4, the crank angle of each cylinder can be grasped in a reliable manner.

Figure 13:
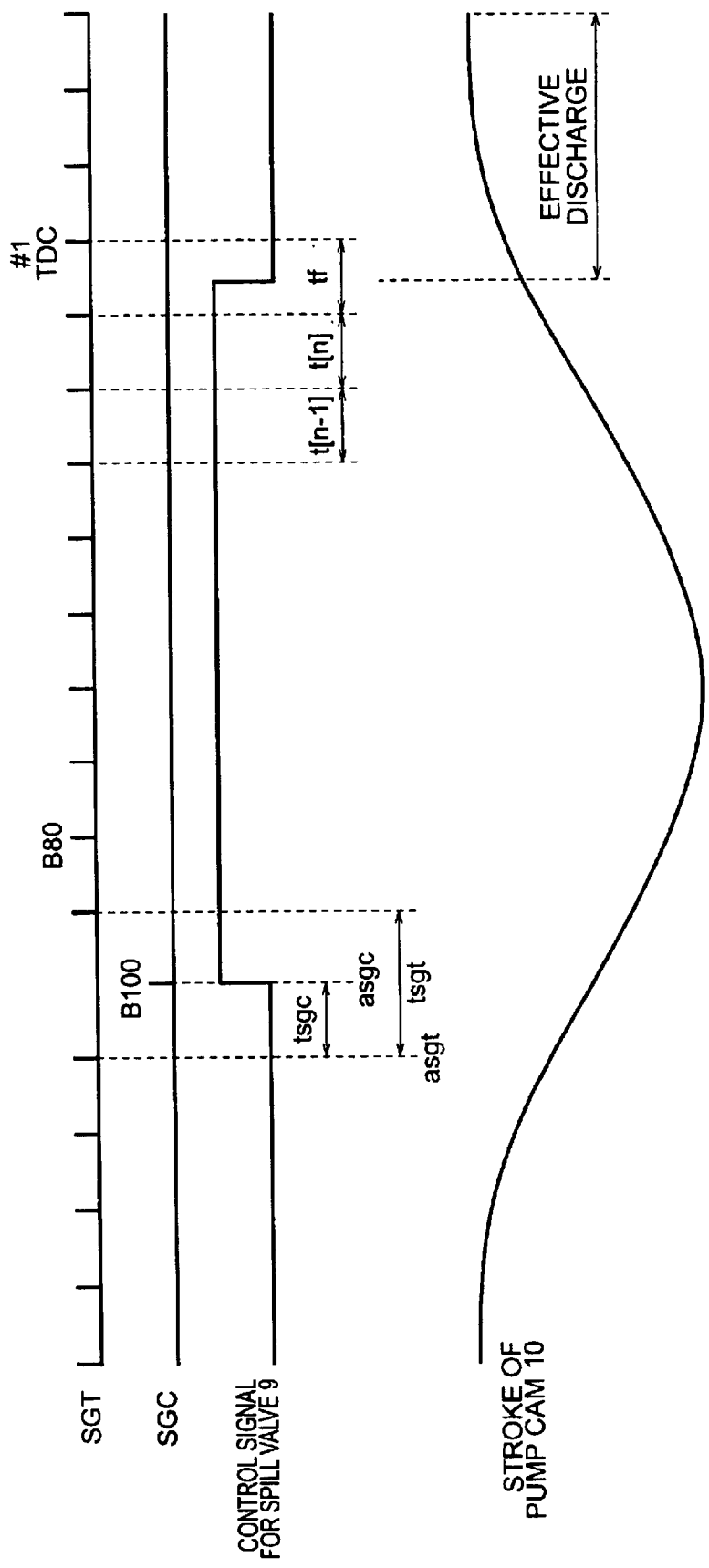
FIG. 13 is a timing chart showing the movement of a high pressure pump in the fuel supply control apparatus according to the third embodiment of the present invention.

For instance, FIG. 13 shows the relation between the control signal for the spill valve 9 and the stroke operation of the pump cam 10 while associating them with the crank angle signal SGT and the cam angle signal SGC corresponding to the operation of the cylinder #1.

The crank angle asgc [degCA] of the cam angle signal SGC are calculated by the following expression (10).

$$asgc = asgt - (tsgc/tsgt \times 20) \tag{10}$$

where asgt represents the crank angle [degCA] of the crank angle signal SGT; tsgc represents the time msec from a pulse timing of the crank angle signal SGT to a pulse timing of the cam angle signal SGC; and tsgt represents the time msec from a pulse timing of the crank angle signal SGT to the following pulse timing thereof.

In expression (10) above, a value "20" by which (tsgc/tsgt) is multiplied corresponds to an angle between adjacent protrusions on the sensor plate 18a arranged in opposition to the crank angle sensor 18.

In FIG. 13, since there exists a pulse of the cam angle signal SGC in an "one-tooth lost portion" of the untoothed portions, the crank angle between adjacent pulses with the one-tooth lost portion interposed therebetween is 20 [degCA]. On the other hand, it is 10 [degCA] in a portion with no missing or lost tooth", and 30 [degCA] in a "two-teeth lost portion".

Subsequently, a crank angle AWspl in a period of time in which the spill valve 9 is turned on is calculated (step S13). The processing in step S13 is executed by the functional blocks shown in the above-mentioned FIG. 5.

Then, by subtracting the ON period AWspl of the spill valve 9 from the crank angle Asgc of the cam angle signal SGC, a crank angle Asplof in which the spill valve 9 is turned off is calculated by the following expression (11) (step S14), and a return is performed while ending the processing routine of FIG. 11.

$$Asplof = Asgc - AWspl \tag{11}$$

Here, note that the value of the crank angle is represented as an angle (B) before top dead center TDC, with the top dead center TDC being made as a reference, and hence the crank angle decreases as it advances in the direction of rotation.

Next, reference will be made to the processing routine in FIG. 12.

First of all, it is determined whether the crank angle Asgt at which the interrupt processing of FIG. 12 is executed is less than or equal to the turn-off angle Asplof of the spill valve 9 (step S21). If it is determined as Asgt≦Asplof (that is, YES), the crank angle that turns off the spill valve 9 has already been exceeded, so the spill valve 9 is turned off (step S27), and a return is carried out while ending the processing routine of FIG. 12.

On the other hand, if it is determined as Asgt>Asplof in step S21 (that is, NO), it is subsequently determined whether the next crank angle Asgt[i+1] of the crank angle signal SGT is less than the turn-off angle Asplof of the spill valve 9 (step S22).

If it is determined as Asgt[i+1]≧Asplof in step S22 (that is, NO), the processing routine of FIG. 12 is ended at once and a return is carried out.

On the other hand, if it is determined as Asgt[i+1]<Asplof in step S21 (that is, YES), the turn-off angle Asplof of the spill valve 9 is subtracted from the current crank angle Asgt to provide a remaining angle AWrem, as shown by the following expression (12) (step S23).

$$AWrem = Asgt - Asplof \quad (12)$$

Subsequently, as can be seen from FIG. 13, a value which is obtained by subtracting the last interpulse time t[n−1] from the current interpulse time t[n] is added to the current interpulse time t[n] based on each pulse detection timing of the crank angle signal SGT to provide the estimated next interpulse time tf, as shown by the following expression (13) (step S24).

$$tf = T[n] + (t[n] - t[n-1]) \quad (13)$$

Thereafter, the estimated time tf at the next pulse of the crank angle signal SGT is divided by an angle AWsgt from the last pulse of the crank angle signal SGT to the current pulse of the crank angle signal SGT, and then multiplied by the remaining angle AWrem to provide a remaining time TWrem, as shown by the following expression (14) (step S25).

$$TWrem = tf/AWsgt \times AWrem \quad (14)$$

Finally, the remaining time TWrem is set in a timer counter (step S26), and a return is carried out while ending the processing routine of FIG. 12.

Thus, when the remaining time TWrem is set in the timer counter, the timer counter begins to be decremented. When the countdown is completed to indicate that the remaining time TWrem has elapsed, the spill valve 9 is turned off.

The crank angle for the control timing of the spill valve 9 is represented as a value between 0 and 180 [degCA] (from top dead center TDC to bottom dead center). For example, −10 [degCA] becomes 170 [degCA] on the next stroke.

Thus, the spill valve 9 can be turned off at accurate timing by counting the pulses of the crank angle signal SGT from the turn-on angle of the spill valve 9 to provide an elapsed angle, and by controlling the remaining angle AWrem by time with the use of the timer counter. As a result, it is possible to control the fuel pressure without being varied or influenced even if there takes place a rotational fluctuation or variation due to the respective strokes of the internal combustion engine 21.

That is, by deciding the control timing of the spill valve 9 by means of the cam angle signal SGC, and by counting the crank angle signal SGT to control the fuel pressure, accuracy in the control timing of the spill valve 9 can be improved, thus making it possible to perform the fuel pressure control with high accuracy.

Embodiment 4.

Although in the first through third embodiments, no particular consideration is given to the rotational speed of the internal combustion engine 21, the crank angle signal SGT may be counted only in a low-speed operating condition of the internal combustion engine 21.

Hereinafter, reference will be made to a fuel supply control apparatus for an internal combustion engine according to a fourth embodiment of the present invention in which the crank angle signal SGT is counted only in the low-speed operating condition of the engine, while referring to flow charts in FIG. 14 and FIG. 15.

Figure 14:
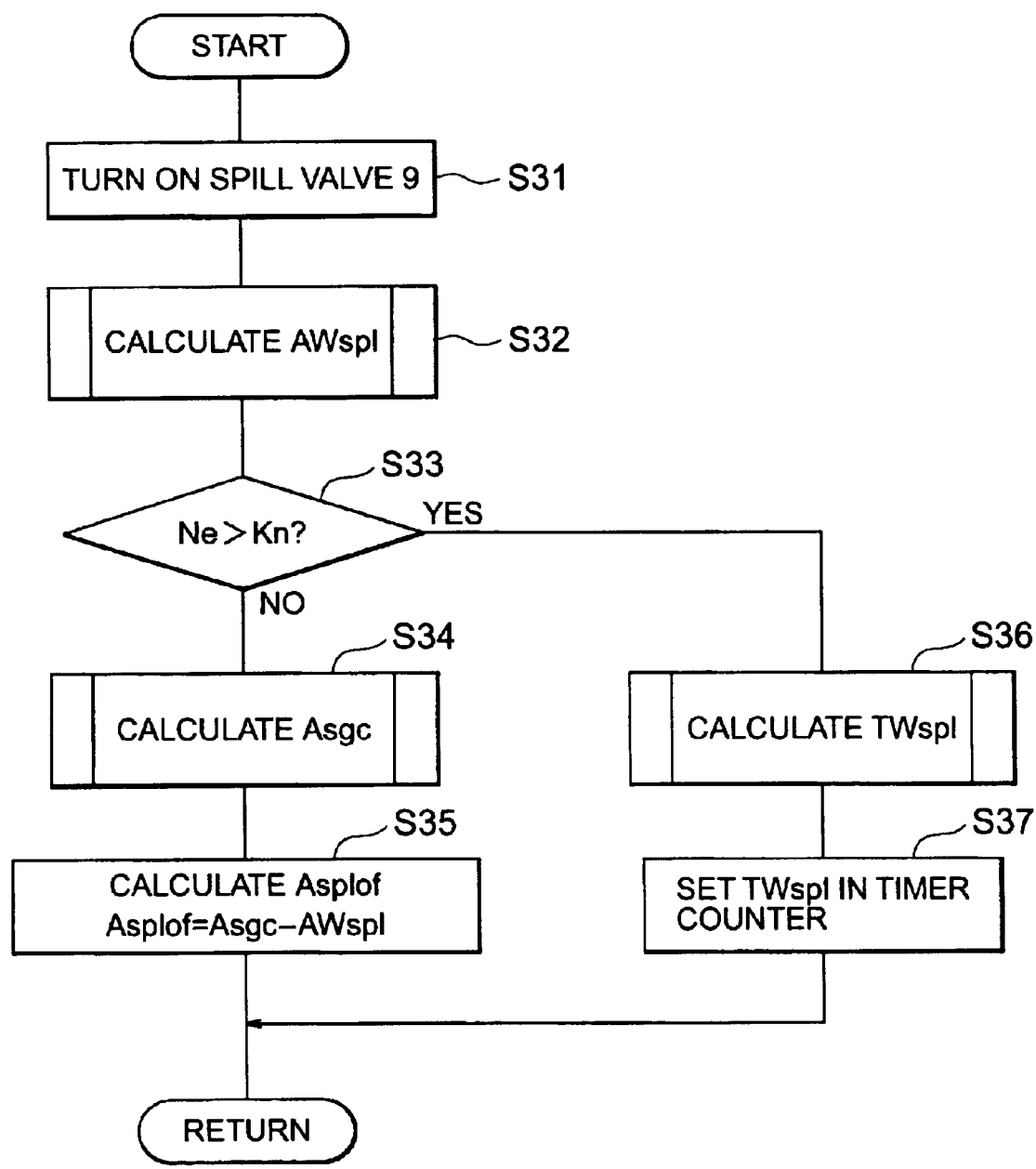
FIG. 14 is a flow chart showing interrupt processing in response to a cam angle signal SGC in a fuel supply control apparatus for an internal combustion engine according to a fourth embodiment of the present invention.
Figure 15:
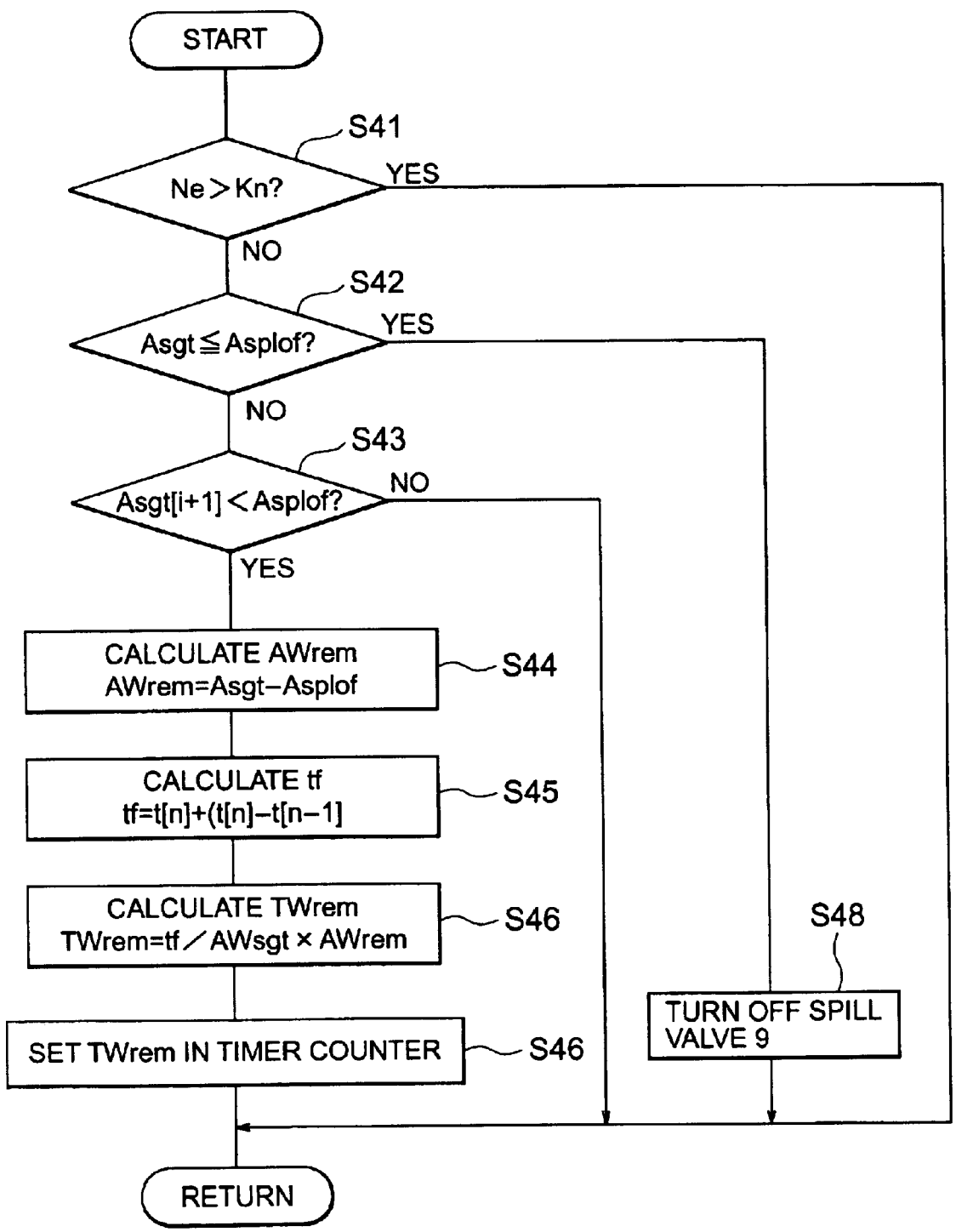
FIG. 15 is a flow chart showing interrupt processing in response to a crank angle signal SGT in a fuel supply control apparatus according to the fourth embodiment of the present invention.

The interrupt processing of FIG. 14 is executed in response to the cam angle signal SGC for controlling the spill valve 9, and the interrupt processing of FIG. 15 is executed at each pulse timing of the crank angle signal SGT.

In general, in a medium-speed and a high-speed operating condition of the engine in which the rotational speed thereof is more stable than in its low-speed operating condition in the vicinity of an idling operation, counting the crank angle signal SGT to control the spill valve 9 has a less effect.

In addition, the arithmetic calculation load of the ECU 20, which increases in the high-speed operating condition, can be alleviated by counting the crank angle signal SGT only in the low-speed operation of the engine.

Moreover, since the valve timing control device operates in the engine operating condition at a medium or higher rotational speed, the fuel pressure control may be deteriorated rather in the transient operation of the valve timing control device.

Accordingly, it is preferable to count the crank angle signal SGT only in the low-speed operating condition.

In FIG. 14, the spill valve 9 is first turned on (step S31), and a crank angle AWspl in a period of time in which the spill valve 9 is turned on is calculated (step S32).

The processing in step S32 corresponding to that in the above-mentioned step S13 (see FIG. 11) is executed by the functional blocks shown in FIG. 5.

Then, it is determining whether the engine rotational speed Ne is larger than a prescribed rotational speed Kn (for example, a determination reference of 1,000 rpm for determining the idle operating condition)(step S33), and if determined as Ne≦Kn (that is, NO), the crank angle Asgc of the cam angle signal SGC is calculated (step S34).

Further, the turn-on period AWspl of the spill valve 9 is subtracted from the crank angle Asgc of the cam angle signal SGC to provide a crank angle Asplof that turns off the spill valve 9, according to the above-mentioned expression (11), similar to the above-mentioned step S14 (see FIG. 11)(step S35), and a return is performed while ending the processing routine of FIG. 14.

On the other hand, if it is determined as Ne>Kn in step S33 (that is, YES), the time TWspl for which the spill valve 9 is turned on is calculated from the crank angle AWspl for the period in which the spill valve 9 is turned on (step S36), and the turn-on time TWspl is set in a timer counter (step S37). Thereafter, the processing routine of FIG. 14 is ended and a return is carried out.

Next, reference will be made to the processing routine in FIG. 15.

First of all, it is determined whether the engine rotational speed Ne is larger than the prescribed rotational speed Kn (for example, 1,000 rpm)(step S41), and if determined as Ne>Kn (that is, YES), the processing of FIG. 15 is ended at once and a return is carried out.

On the other hand, if it is determined as Ne≦Kn in step S41 (that is, NO), then it is further determined whether the crank angle Asgt at which the interrupt processing of FIG. 15 is executed is less than or equal to the turn-off angle Asplof of the spill valve 9 (step S42). If it is determined as Asgt≦Asplof (that is, YES), the crank angle that turns off the spill valve 9 has already been exceeded, so the spill valve 9 is turned off (step S48), and a return is carried out while ending the processing routine of FIG. 15.

If, however, it is determined as Asgt>Asplof in step S42 (that is, NO), then it is determined whether the next crank angle Asgt[i+1] of the crank angle signal SGT is less than the turn-off angle Asplof of the spill valve 9 (step S43). If it is determined as Asgt[i+1]≧Asplof (that is, NO), the processing routine of FIG. 15 is ended at once and a return is carried out.

On the other hand, if it is determined as Asgt[i+1]<Asplof in step S43 (that is, YES), the turn-off angle Asplof of the spill valve 9 is subtracted from the current crank angle Asgt, and a remaining angle AWrem is calculated according to the above-mentioned expression (12), similar to the above-mentioned step S23 (see FIG. 12) (step S44).

Subsequently, according to the above-mentioned expression (13) similar to the above-mentioned step S24, the estimated next interpulse time tf is calculated by adding a value, which is obtained by subtracting the last interpulse time t[n−1] of the crank angle signal SGT from the current interpulse time t[n] thereof, to the current interpulse time t[n] (step S45).

Furthermore, according to the above-mentioned expression (14) similar to the above-mentioned step S25, the estimated next time tf is divided by the crank angle AWsgt from the last pulse of the crank angle signal SGT to the current pulse thereof, and then multiplied by the remaining angle AWrem to provide a remaining time TWrem (step S46).

Finally, the remaining time TWrem is set in a timer counter (step S47), and a return is carried out while ending the processing of FIG. 15.

Hereinafter, the timer counter is decremented, and the spill valve 9 is turned off when the remaining time TWrem has elapsed.

Although here in steps S33 and S41, the engine rotational speed Ne is compared with the prescribed rotational speed Kn and it is then determined whether the engine is in the idle operating condition, such a determination can instead be made based on the presence or absence of the valve timing control.

That is, since the valve timing control is not generally executed in an idle rotation range in which the engine rotational speed is less than the prescribed rotational speed Kn (i.e., the relative angle of the cam angle is fixed to the most retard angle position), the similar control can be achieved by replacing the step S33 in FIG. 14 and the step S41 in FIG. 15 with "Is VVT (Valve Timing Control) executed ?", respectively.

Thus, by controlling the spill valve 9 based on the counted pulses of the crank angle signal SGT only at the time of the idle operation (at low rotational speed) at which the VVT control is not executed, it is possible to prevent the deterioration of the fuel pressure control due to a rotational fluctuation or variation at the low rotational speed.

More specifically, whether the crank angle signal SGT is to be counted or not so as to control the spill valve 9 is switched according to the operating condition of the internal combustion engine 21, so that counting the crank angle signal SGT for correction can be made only in a necessary operating condition, thus making it possible to simplify the control without reducing fuel pressure controllability.

In addition, by controlling the spill valve 9 based on the counted pulses of the crank angle signal SGT only in the non-operating condition of the valve timing control device, it is possible to prevent generation of a fuel pressure fluctuation or variation in a direction opposite an actual control direction in the transient engine operation due to the operation of the valve timing control device. At this time, the engine is operating at a medium or higher rotational speed, and hence the engine rotational speed Ne is stable so there takes place no fuel pressure fluctuation or variation.

That is, by switching whether correction is to be made by the crank angle signal SGT or not according to the rotational speed Ne of the internal combustion engine 21, the correction is made only in the low rotational speed such as the idle operating condition for instance, thereby making it possible to suppress the fuel pressure fluctuation or variation.

Further, a correction deviation due to the operation of the valve timing control device can be prevented by switching whether the correction by the crank angle signal SGT is to be made in the control state of the valve timing control device (for instance, correction is not executed when the valve timing control device is in a transient operation). As a result, controllability can be improved.

In the above-mentioned third and fourth embodiments, the pulses of the crank angle signal SGT are counted so as to decide the timing at which the spill valve 9 is turned off, and the spill valve 9 controls the amount of discharge of the high pressure pump 5. Accordingly, an effective discharge period of the high pressure pump 5 is decided by turning off the spill valve 9 on the exhaust stroke from the bottom position of the pump cam 10 to the top position thereof.

Besides, if the timing at which the spill valve 9 is turned off is between pulses of the crank angle signal SGT, the turn-off timing of the spill valve 9 is set by estimating the period from the interpulse time (i.e., time between the adjacent pulses) of the crank angle signal SGT. Consequently, the narrower the pulse intervals of the crank angle signal SGT, the better does control accuracy become. Accordingly, the untoothed portions of the crank angle signal SGT are set "on the suction stroke of the high pressure pump 5" from the top position of the pump cam 10 to the bottom position thereof. As a result, accuracy in the control of the spill valve 9 can be improved.

While the invention has been described in terms of preferred embodiments, those skilled in the art will recognize that the invention can be practiced with modifications within the spirit and scope of the appended claims.

What is claimed is:

1. A fuel supply control apparatus for an internal combustion engine, which serves to supply fuel in a fuel tank to an injector installed in a combustion chamber of an internal combustion engine, said apparatus comprising:

a crank angle detection section for generating a crank angle signal in synchronization with the rotation of a crankshaft of said internal combustion engine;

a cam angle detection section for generating a cam angle signal in synchronization with the rotation of a camshaft of said internal combustion engine;

a positive displacement fuel supply section having a suction stroke and a discharge stroke synchronized with the rotation of said camshaft for supplying said fuel to said injector; and an effective stroke changing section for changing an effective stroke related to the discharge stroke of said fuel supply section;

wherein said effective stroke changing section operates in synchronization with said crank angle signal and said cam angle signal so as to change said effective stroke based on said cam angle signal wherein said effective stroke changing section operates in synchronization with said crank angle signal and said cam angle signal so as to change said effective stroke based on said cam angle signal, wherein said effective stroke changing section changes said effective stroke by correcting a deviation of each pulse of said cam angle signal.

2. A fuel supply control apparatus for an internal combustion engine, which serves to supply fuel in a fuel tank to an injector installed in a combustion chamber of an internal combustion engine, said apparatus comprising:

a crank angle detection section for generating a crank angle signal in synchronization with the rotation of a crankshaft of said internal combustion engine;

a cam angle detection section for generating a cam angle signal in synchronization with the rotation of a camshaft of said internal combustion engine;

a positive displacement fuel supply section having a suction stroke and a discharge stroke synchronized with the rotation of said camshaft for supplying said fuel to said injector; and an effective stroke changing section for changing an effective stroke related to the discharge stroke of said fuel supply section, wherein said effective stroke changing section changes said effective stroke by using said cam angle signal on the suction stroke of said fuel supply section.

3. The fuel supply control apparatus for an internal combustion engine as set forth in claim 2, wherein a period from input timing of said cam angle signal related to the control of said effective stroke changing section to termination timing of the suction stroke of said fuel supply section is set longer than dead time due to an operation delay of said effective stroke changing section.

4. The fuel supply control apparatus for an internal combustion engine as set forth in claim 2, wherein a period from start timing of the suction stroke of said fuel supply section to input timing of said cam angle signal related to the control of said effective stroke changing section is set longer than a runup time to control said effective stroke changing section.

5. A fuel supply control apparatus for an internal combustion engine, which serves to supply fuel in a fuel tank to an injector installed in a combustion chamber of an internal combustion engine, said apparatus comprising:

a crank angle detection section for generating a crank angle signal in synchronization with the rotation of a crankshaft of said internal combustion engine;

a cam angle detection section for generating a cam angle signal in synchronization with the rotation of a camshaft of said internal combustion engine;

a positive displacement fuel supply section having a suction stroke and a discharge stroke synchronized with the rotation of said camshaft for supplying said fuel to said injector; and an effective stroke changing section for changing an effective stroke related to the discharge stroke of said fuel supply section, wherein said effective stroke changing section decides control timing of said effective stroke changing section based on a cam angle indicated by said cam angle signal, and changes said effective stroke by counting the number of pulses of said crank angle signal.

6. The fuel supply control apparatus for an internal combustion engine as set forth in claim 5, wherein said effective stroke changing section decides, based on an operating condition of said internal combustion engine detected by counting the number of pulses of said crank angle signal, whether said effective stroke can be changed or not.

7. The fuel supply control apparatus for an internal combustion engine as set forth in claim 6, wherein the operating condition of said internal combustion engine includes the rotational speed thereof.

8. The fuel supply control apparatus for an internal combustion engine as set forth in claim 6, wherein said internal combustion engine has a valve timing control section for controlling operation timing of at least one of an intake valve and an exhaust valve, and the operating condition of said internal combustion engine includes the control state of said valve timing control section.

9. The fuel supply apparatus for an internal combustion engine as set forth in any one of claims 5 through 11, wherein said crank angle detection section has an untoothed portion corresponding to a specific crank angle position for which no pulse of said crank angle signal is generated, said untoothed portion being arranged so as to correspond to the suction stroke of said fuel supply section.

* * * * *